(12) United States Patent
Morningstar et al.

(10) Patent No.: US 12,321,958 B2
(45) Date of Patent: Jun. 3, 2025

(54) UTILIZING A KNOWLEDGE GRAPH TO IMPLEMENT A DIGITAL SURVEY SYSTEM

(71) Applicant: Qualtrics, LLC, Provo, UT (US)

(72) Inventors: Jamie Elizabeth Morningstar, Orem, UT (US); Catherine Mary Williams, Seattle, WA (US)

(73) Assignee: Qualtrics, LLC, Provo, UT (US)

( * ) Notice: Subject to any disclaimer, the term of this patent is extended or adjusted under 35 U.S.C. 154(b) by 66 days.

(21) Appl. No.: 17/538,648

(22) Filed: Nov. 30, 2021

(65) Prior Publication Data

US 2023/0169527 A1   Jun. 1, 2023

(51) Int. Cl.
  *G06Q 30/0203* (2023.01)
  *G06N 5/02* (2023.01)
  *G06Q 10/0639* (2023.01)

(52) U.S. Cl.
  CPC .......... *G06Q 30/0203* (2013.01); *G06N 5/02* (2013.01); *G06Q 10/06393* (2013.01)

(58) Field of Classification Search
  None
  See application file for complete search history.

(56) References Cited

U.S. PATENT DOCUMENTS

| | | | |
|---|---|---|---|
| 11,557,276 B2 * | 1/2023 | Bender | G06N 5/022 |
| 2020/0286463 A1 * | 9/2020 | Galitsky | G06F 16/35 |
| 2021/0224346 A1 * | 7/2021 | Peng | G06N 5/027 |
| 2022/0384001 A1 * | 12/2022 | Gnanasambandam | G06N 5/022 |

FOREIGN PATENT DOCUMENTS

WO   WO-2013033029 A2 *  3/2013 ......... G06Q 30/0201

OTHER PUBLICATIONS

Bilal Abu-Salih, Domain-specific Knowledge Graphs: A survey, Oct. 31, 2020, King Abdullah II School of Information Technology The University of Jordan (Year: 2020).*

* cited by examiner

*Primary Examiner* — Jerry O'Connor
*Assistant Examiner* — Matthew H Divelbiss
(74) *Attorney, Agent, or Firm* — Keller Preece PLLC

(57) ABSTRACT

This disclosure relates to methods, non-transitory computer readable media, and systems generate a knowledge graph to implement, process, and analyze digital surveys and digital survey data cross computer networks. In particular, the disclosed systems can generate and utilize a knowledge graph to determine and coordinate topic ontologies, store and access digital survey data, and generate digital benchmarks. For example, the disclosed systems generate a knowledge graph based on a predefined ontology of topics by connecting topic nodes via a plurality of edges. Additionally, the disclosed systems receive survey data associated with administering an electronic survey to respondent client devices. The disclosed systems extract topics from the survey data and determine connections between the survey data and the topic nodes in the knowledge graph. In one or more embodiments, the disclosed systems generate digital benchmarks between sets of data based on the relationships.

20 Claims, 12 Drawing Sheets

UTILIZING A KNOWLEDGE GRAPH TO IMPLEMENT A DIGITAL SURVEY SYSTEM

BACKGROUND

Recent years have seen significant improvement in software and hardware platforms for collecting and processing digital survey information across computer networks. For example, conventional electronic survey systems can generate digital surveys, distribute digital surveys to various respondent devices, collect digital feedback from the various respondent devices, and then process the digital survey response data to generate various user interfaces, digital predictions, and digital recommendations. Additionally, conventional electronic survey systems often store and organize digital survey data and digital survey response data for utilization in further analyzing performance of various items or features.

In connection with administering and collecting digital survey data corresponding to respondent devices, some conventional systems store digital information in flat databases (e.g., as independent data entries in which records are stored as individual rows with different values in columns). Accordingly, the conventional systems that use flat databases of independent data to store digital survey data rigidly store information in a way that interferes with data analysis and manipulation. To illustrate, while storing data in flat databases provides a simple, easy way to store related data, flat databases are unable to represent complex relationships between entities stored in the database.

Additionally, these conventional systems that utilize flat database storage structures lack efficiency in using stored survey response data. For instance, when attempting to determine relationships between entities from a flat database, conventional systems apply filters to sort through the rows and columns to identify specific information. The conventional systems then often require an administrator device and corresponding user to determine relationships between database entities by viewing the information after applying the filters. Furthermore, identifying complex relationships can involve applying a large number of filters to a large number of database entries, which can require a significant amount of time and computing resources. Thus, the conventional systems are inefficient in both accessing information (e.g., due to user involvement) and identifying connections between entities.

SUMMARY

This disclosure describes one or more embodiments of methods, non-transitory computer readable storage media, and systems that solve the foregoing problems in addition to providing other benefits. In particular, the disclosed systems can generate and utilize a knowledge graph to determine and coordinate topic ontologies/schematizations, store and access digital survey data, generate digital benchmarks, and generate other inferences and recommendations. In this manner, the disclosed systems can more efficiently and flexibly store, retrieve, and access digital survey data; more accurately utilize ontologies across different clients and survey campaigns; and more precisely generate digital benchmarks that reflect detailed features corresponding to digital surveys and respondent characteristics.

For example, in one or more embodiments, the disclosed systems generate a knowledge graph based on a predefined ontology of topics by connecting topic nodes via a plurality of edges that indicate relationships associated with the predefined ontology of topics. Additionally, the disclosed systems receive survey data (including response data) associated with administering an electronic survey to respondent client devices. The disclosed systems can extract topics from the survey data and determine connections between the survey data and the topic nodes in the knowledge graph. In one or more embodiments, once the disclosed systems have generated the knowledge graph and determined relationships between received survey data and nodes in the knowledge graph, the disclosed systems generate digital benchmarks between sets of data based on the relationships. By utilizing a knowledge graph based on a predefined topic ontology to infer relationships between data points in survey data, the disclosed systems provide flexible and efficient storage and recall of survey data in connection with any number of entities using varying terminologies.

BRIEF DESCRIPTION OF THE DRAWINGS

The detailed description refers to the drawings briefly described below.

DETAILED DESCRIPTION

Figure 1:
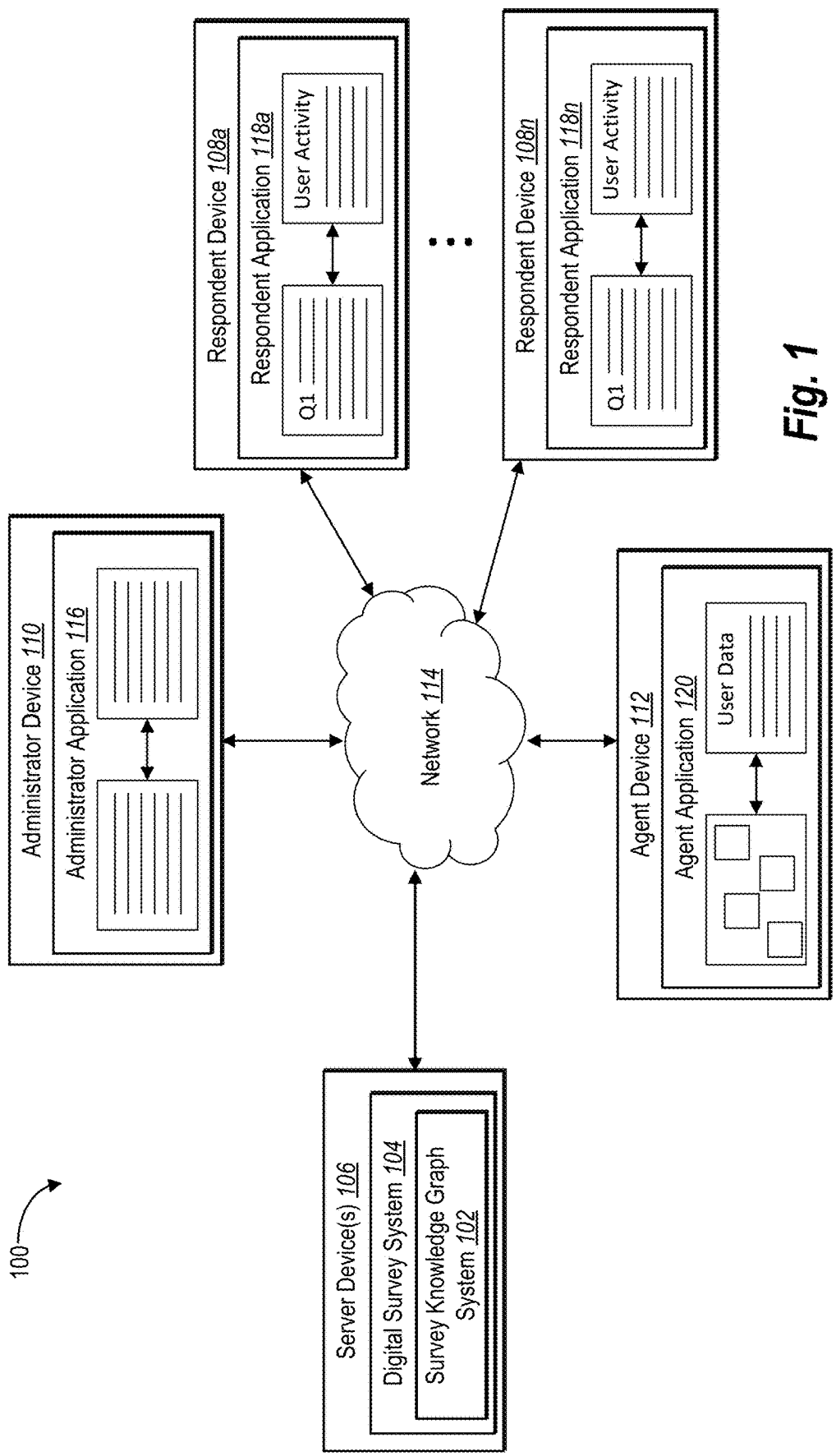
FIG. 1 illustrates a block diagram of a system environment in which a survey knowledge graph system can operate in accordance with one or more embodiments.

This disclosure describes embodiments of a survey knowledge graph system that utilizes a knowledge graph to implement, process, and analyze digital surveys and digital survey data across computer networks. In particular, the survey knowledge graph system can generate a knowledge graph comprising topic nodes, experience nodes, person nodes, and/or survey data nodes with corresponding edges that reflect relationships between the various nodes. The survey knowledge graph system can then utilize the knowledge graph to infer topics from digital surveys, coordinate topic ontologies across different clients, store and access digital survey data, and generate digital benchmarks.

To illustrate, in one or more embodiments, the survey knowledge graph system first generates a knowledge graph including a plurality of nodes based on a predefined ontology (e.g., determined based on ontologies associated with one or more entities or based relationships extracted from a training dataset) of topics and edges indicating relationships associated with the topics. In connection with administering an electronic survey to respondent devices, the survey knowledge graph system receives survey data (e.g., questions, responses) associated with the administered electronic survey. The survey knowledge graph system extracts topics from the survey data and then connects the extracted topics to nodes in the knowledge graph by determining relationships between the extracted topics and the predefined ontology. By connecting survey data received from respondent devices to nodes in the knowledge graph based on a predefined ontology of topics, the survey knowledge graph system can attach a schematization to individual datasets and infer relationships within and between the datasets utilizing the knowledge graph.

As mentioned, in one or more embodiments, the survey knowledge graph system generates a knowledge graph based on a predefined ontology of topics. In particular, the survey knowledge graph system can determine the predefined ontology of topics based on defined topics associated with one or more entities. In one or more embodiments, the survey knowledge graph system generates an ontology by determining a single set of topics based on a plurality of sets of topics corresponding to different entities. For example, the survey knowledge graph system generates a plurality of topic nodes corresponding to known topics associated with one or more entities. Additionally, the survey knowledge graph system connects the topic nodes via edges that indicate relationships between the topics in the predefined ontology.

Additionally, the survey knowledge graph system receives survey data associated with an electronic survey administered to a plurality of respondents. For example, the survey knowledge graph system (or a digital survey system) can administer an electronic survey including one or more electronic survey questions to respondent devices in connection with a particular entity, event, product, or service. The survey knowledge graph system receives survey data including response data and information associated with the electronic survey questions from respondent devices and/or the digital survey system. In some embodiments, response data includes text response data associated with an electronic survey question that allows an unstructured/freeform text response from respondents. In additional embodiments, response data includes numeric response data (e.g., numeric values such as rankings/ratings, manually entered numeric values) or choice data (e.g., responses to multiple choice questions).

After receiving survey data associated with an electronic survey, in one or more embodiments, the survey knowledge graph system extracts topics from the survey data. Specifically, the survey knowledge graph system analyzes the survey data to determine that the survey data corresponds to one or more topics. For instance, the survey knowledge graph system utilizes natural language processing to process questions or responses to extract topics indicated by words or phrases in the questions/responses. Additionally, the survey knowledge graph system can determine topics associated with questions from metadata or other data (e.g., person data or directory data obtained from a user profile) associated with an electronic survey question or an electronic survey that indicates the topics.

In one or more embodiments, the survey knowledge graph system utilizes the knowledge graph to connect extracted topics from survey data to nodes in the knowledge graph. For instance, the survey knowledge graph system determines connections between an extracted topic from survey data and one or more topic node via one or more edges and/or one or more other nodes in the knowledge graph. To illustrate, the survey knowledge graph system uses a data comparison operation including, but not limited to, machine-learning or keyword searching/matching to determine that an extracted topic corresponds to a topic of the predefined ontology of topics (e.g., corresponding to a particular topic node of the knowledge graph). In some embodiments, the survey knowledge graph system can infer these relationships based on connections between nodes of the knowledge graph (e.g., common connections between a topic node and a survey response node). In some embodiments, the survey knowledge graph system generates experience nodes to connect extracted topics from survey data to nodes in the knowledge graph.

In addition to connecting experience nodes to nodes in the knowledge graph, in one or more embodiments, the survey knowledge graph system generates one or more intermediate nodes between an experience node and a topic node. Specifically, the survey knowledge graph system can determine that an experience node corresponds to a particular respondent. The survey knowledge graph system can generate a person node corresponding to the respondent including information about the respondent, for instance, based on the survey data, a user profile for the respondent, a respondent device of the respondent. The survey knowledge graph system can then connect the person node to a node in the knowledge graph and connect the experience node to the person node to indicate the connection between the survey data and a given topic. In some embodiments, the survey knowledge graph system also utilizes person data to create segments of similar person nodes (e.g., based on demographic information in the person nodes).

In additional embodiments, the survey knowledge graph system generates nodes associated with additional data types based on survey data and/or other data sources for connecting within the knowledge graph. To illustrate, the survey knowledge graph system generates activity nodes including information about transactions or other respondent activities to connect to person nodes. In some embodiments, the survey knowledge graph system also generates operational nodes including operational data associated with activities or topics to connect to activity nodes or topic nodes, respectively, within the knowledge graph.

Once the survey knowledge graph system has generated and connected nodes associated with survey data to topic nodes in a knowledge graph based on a predefined ontology of topics, the survey knowledge graph system can use the knowledge graph to perform operations on the data. In one or more embodiments, the survey knowledge graph system leverages the relationships between nodes in the knowledge graph to generate digital benchmarks between datasets. For example, the survey knowledge graph system infers relationships between data points based on the strengths of edges within the knowledge graph and then uses the relationships to compare a first dataset to a second dataset. To illustrate, the survey knowledge graph system can compare performance of entities, products, services, events, etc., based on response data associated with a plurality of respondents.

In additional embodiments, the survey knowledge graph system utilizes the knowledge graph to provide data during a real-time interaction. In some examples, the survey knowledge graph system quickly and efficiently determines data points and relationships between the data points based on the nodes and edges in the knowledge graph. The survey knowledge graph system then provides the accessed data to a client device (e.g., administrator device, agent device) for use during the real-time interaction. For instance, the survey knowledge graph system accesses data associated with one or more topics during a support session, a call (or chat or other synchronous interaction) between an agent and a user, or other interaction involving a respondent corresponding to a person node in the knowledge graph. The survey knowledge graph system can then provide the data obtained from the knowledge graph to a client device.

As suggested above, the survey knowledge graph system overcomes several technical deficiencies of conventional survey systems. For example, the survey knowledge graph system improves the flexibility of computing systems that administer electronic surveys. As mentioned, while conventional survey systems typically utilize flat databases or other simple storage structures for storing data corresponding to administered electronic surveys, the conventional survey systems are unable to capture complex relationships between data points in the simplistic storage structures. Accordingly, in contrast to the conventional survey systems, the survey knowledge graph system flexibly stores survey data by determining connections between the survey data and nodes in a knowledge graph based on a predefined topic ontology. In particular, by connecting the survey data to topic nodes in the knowledge graph, the survey knowledge graph system is able to represent complex relationships involving the survey data. The survey knowledge graph system also utilizes the knowledge graph to represent relationships for survey data across a plurality of nodes of different types.

Additionally, the survey knowledge graph system also improves the efficiency of computing systems that administer electronic surveys. In particular, the manner in which data is stored has a significant impact on the speed and efficiency with which computing devices are able to retrieve stored data. Accordingly, in contrast to conventional systems that store data in a flat database, the survey knowledge graph system provides improved recall efficiency via the use of a knowledge graph. For example, by connecting survey data from an electronic survey to nodes in a knowledge graph, the survey knowledge graph system can efficiently infer relationships between data points involving the survey data. Specifically, the survey knowledge graph system utilizes edges between nodes in the knowledge graph to determine the relationships without needing to apply many different filters to the data (e.g., as is the case with flat databases).

Furthermore, the survey knowledge graph system improves the accuracy over conventional systems. Specifically, the survey knowledge graph system more accurately connects different ontologies of topics and datasets across different entities and electronic survey campaigns. For instance, by generating a knowledge graph based on a predefined ontology of topics and associating different datasets with the predefined ontology with nodes connected via edges representing relationships in the datasets, the survey knowledge graph system provides more accurate inferences based on the datasets. Additionally, the survey knowledge graph system more accurately aligns detailed features or factors of datasets including survey data, which is particularly useful in generating digital benchmarks.

As used herein, the terms "electronic survey" and "survey" refer to an electronic communication used to collect information. For example, the term survey can include an electronic communication in the form of a poll, questionnaire, census, or other type of sampling. To illustrate, an electronic survey can include an electronic communication that includes one or more electronic survey questions based on information requested by an entity. Further, the term survey as used herein can generally refer to a method of requesting and collecting electronic data from respondents via an electronic communication distribution channel. As used herein, the term "respondent" refers to a person or entity that participates in or responds to a survey. Also, as used herein, the term "administrator" refers to a person or entity that creates or causes the administration of a survey.

Additionally, as used herein, the term "electronic survey question," "survey question," or simply "question" refers to a prompt included in a survey to invoke a response from a respondent. For example, a survey question can include one of many different types of questions, including, but not limited to, perception, multiple choice, open-ended, ranking, scoring, summation, demographic, dichotomous, differential, cumulative, dropdown, matrix, net promoter score (NPS), single textbox, heat map, and any other type of prompt that can invoke a response from a respondent. A survey question can include a prompt portion as well as an available answer portion that corresponds to the survey question.

As used herein, the term "response" refers to electronic data a respondent provides with respect to an electronic survey question. The electronic data can include content and/or feedback from the respondent in response to a survey question. Depending on the question type, the response can include, but is not limited to, a selection, a text input, an indication of an answer selection, a user provided answer, and/or an attachment. In one or more embodiments, some responses do not have a fixed, predetermined structure. For example, an unstructured response can include an open-ended, freeform text response that allows a respondent to input any number of characters (or a threshold number of characters) into a text field in response to a question. In one or more embodiments, a response includes a structured response such as a response from, for example, a set of fixed choices (e.g., multiple choice).

Additionally, as used herein, the term "survey data" refers to information related to an electronic survey. For example, survey data includes data from electronic surveys such as electronic survey questions (e.g., question portions, answer portions), entities associated with the electronic surveys (e.g., survey creators), survey topics/categories, and responses to electronic surveys. In addition, as used herein, the term "response data" refers to responses provided by respondent client devices to electronic survey questions. To illustrate, response data includes structured responses and/or unstructured responses.

As used herein, the term "topic" refers to an idea or concept described by words or phrases. In some embodiments, a topic includes an organizational concept corresponding to an entity. Additionally, as used herein, the terms "ontology of topics" and "topic ontology" refer to a collection, organization, or arrangement of topics. For example, a topic ontology can include a representation of concepts (e.g., definitions of the topics and relations between the concepts). For instance, a topic ontology includes a group of topics related to a particular entity (e.g., known definitions of the topics in the group of topics and how the topics relate to one another). Accordingly, in some embodiments, a topic ontology for a first entity may be different than a topic ontology for a second entity.

As used herein, the term "entity" refers to a person, a group of people, or an organization associated with a person or group of people. For example, an entity can refer to a single individual such as, but not limited to, an owner, manager, employee, or customer. Alternatively, an entity can refer to a business, association, or other organized body of people.

As used herein, the term "knowledge graph" refers to a graph-structured data model that includes nodes and edges. In one or more embodiments, a knowledge graph is based on a topic ontology to include topic nodes representing topics and edges connecting the topic nodes based on relationships between the corresponding topics. Additionally, a knowledge graph can include additional nodes representing various additional entities such as businesses, products, users (e.g., customers, survey respondents), activities (e.g., purchases, transactions), products, services, or events. In some instances, a knowledge graph includes nodes representing information about other nodes (e.g., transactional nodes, operational nodes). A knowledge graph can further include experience nodes representing response data or other survey data related to electronic surveys.

Turning now to the figures, FIG. 1 illustrates a block diagram of a system environment ("environment") 100 in which a survey knowledge graph system 102 operates as part of a digital survey system 104 in accordance with one or more embodiments. As illustrated in FIG. 1, the system environment 100 includes server device(s) 106, respondent devices 108a-108n, an administrator device 110, and an agent device 112 communicating via a network 114. As shown in FIG. 1, the digital survey system 104 includes the survey knowledge graph system 102. Additionally, the administrator device 110 includes an administrator application 116, each of the respondent devices 108a-108n includes a respondent application 118a-118n, and the agent device 112 includes an agent application 120.

In one or more embodiments, the server device(s) 106 enable features, processes, methods, and systems described herein using, for example, the digital survey system 104 and/or the survey knowledge graph system 102. Specifically, the digital survey system 104 comprises computer executable instructions that, when executed by a processor of the server device(s) 106, perform actions to coordinate with the administrator device 110 and/or the respondent devices(s) 108a-108n to administer electronic surveys. For example, the digital survey system 104 communicates with the administrator device 110 via the network 114 to administer electronic surveys to the respondent devices 108a-108n. Additionally, the digital survey system 104 communicates with the respondent client devices 108a-108n via the network 114 to obtain response data and/or other survey data in connection with the administered electronic surveys. Additionally, the digital survey system 104 can communicate with the digital survey system 104 to obtain one or more portions of survey data associated with an electronic survey.

In connection with administering electronic surveys, FIG. 1 illustrates that the digital survey system 104 also includes the survey knowledge graph system 102 to generate and maintain a knowledge graph including information associated with one or more entities. For example, the survey knowledge graph system 102 generates a knowledge graph based on a predefined set of topics associated with the one or more entities. To illustrate, the survey knowledge graph system 102 generates a plurality of nodes for the set of topics and a plurality of edges between the nodes based on relationships corresponding to the set of topics.

Furthermore, in one or more embodiments, the survey knowledge graph system 102 adds information to the knowledge graph based on electronic surveys associated with the one or more entities. To illustrate, the survey knowledge graph system 102 processes survey data received from the administrator device 110 and/or the respondent client devices 108a-108n to extract topics from the survey data. The survey knowledge graph system 102 can then determine connections between the extracted topics and the nodes in the knowledge graph. For instance, the survey knowledge graph system 102 can generate nodes including the survey data and then connect the nodes to existing nodes within the knowledge graph via a plurality of edges to indicate the relationships between data points in the survey data and the topics in the knowledge graph.

In additional embodiments, the survey knowledge graph system 102 generates nodes for information related to entities and respondents. For instance, the survey knowledge graph system 102 generates nodes representing users (e.g., respondents) to store information about the users, such as information stored in user profiles. The survey knowledge graph system 102 also stores information representing activities associated with the users within the knowledge graph related to the entities. In some embodiments, the survey knowledge graph system 102 generates nodes for different types of information about users and generates edges to connect the nodes to existing nodes within the knowledge graph (e.g., nodes for the users and/or the topics) based on the topics extracted from survey data.

FIG. 1 also illustrates that the server device(s) 106 can provide data associated with electronic surveys and/or data from a knowledge graph to one or more devices. To illustrate, the server device(s) 106 provide response data received from the respondent devices 108a-108n to the administrator device 110. Additionally, the survey knowledge graph system 102 utilizes the knowledge graph to compare data and/or infer information or insights from the data in the knowledge graph to provide to the administrator device 110. Furthermore, the survey knowledge graph system 102 can utilize the knowledge graph to provide data associated with users to the agent device 112 (e.g., via the agent application 120). In one or more embodiments, the survey knowledge graph system 102 provides user data to the agent device 112 while an agent is involved in an interaction with a user.

In one or more embodiments, the server device(s) 106 include a variety of computing devices, including those described below with reference to FIG. 10. For example, the server device(s) 106 includes one or more servers for storing and processing data associated with machine-learning tasks, such as, but not limited to, machine-learning models or datasets. In some embodiments, the server device(s) 106 also include a plurality of computing devices in communication with each other, such as in a distributed storage environment. In some embodiments, the server device(s) 106 include an application server, a communication server, a web-hosting server, a social networking server, a digital content campaign server, or a digital communication management server.

In one or more embodiments, the administrator device 110 and the respondent devices 108a-108n include any one of various types of client devices. For example, the administrator device 108 and the respondent devices 110a-110n may be mobile devices (e.g., a smart phone, tablet), laptops, desktops, or any other type of computing devices, such as those described below with reference to FIG. 10. Additionally, the server device(s) 106 may include one or more computing devices, including those explained below with reference to FIG. 10. The server device(s) 106, the administrator device 110, and the respondent devices 108a-108n may communicate using any communication platforms and technologies suitable for transporting data and/or communication signals, including the examples described below with reference to FIG. 11.

In one or more embodiments, to administer an electronic survey, an administrator interacts with an administrator application 116 on the administrator device 110. Similarly, to access digital surveys, compose textual responses, or other functions of the digital survey system 104, in some implementations, respondents interact with respondent applications 118a-118n, respectively. In some embodiments, the administrator application 116 and/or the respondent applications 118a-118n comprise web browsers, applets, or other software applications (e.g., native applications or web applications) available to the administrator device 108 or the respondent devices 108a-108n, respectively. Additionally, in some instances, the digital survey system 104 provides data packets including instructions that, when executed by the administrator device 108 or the respondent devices 108a-108n, create or otherwise integrate the administrator application 116 or the respondent applications 118a-118n within an application or webpage for the administrator device 110 or the respondent devices 108a-108n, respectively. For example, in response to an electronic survey question provided by the administrator device 110 (e.g., via the digital survey system 104), a respondent can use a respondent application to provide a response to the question. The respondent devices 108a-108n can then send the responses provided by the respondents back to the administrator device 110 (e.g., via the digital survey system 104).

Additionally, as shown in FIG. 1, the system environment 100 includes the network 114. The network 114 enables communication between components of the system environment 100. In one or more embodiments, the network 114 may include the Internet or World Wide Web. Additionally, the network 114 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the devices and components of the system environment 100 can communicate via the network 114 using one or more communication platforms and technologies suitable for transporting data and/or communication signals, including any known communication technologies, devices, media, and protocols supportive of data communications, examples of which are described with reference to FIG. 11.

Although FIG. 1 illustrates a particular arrangement of the server device(s) 106, the administrator device 110, the respondent devices 108a-108n, the agent device 112, and the network 114, various additional arrangements are possible.

For example, the server device(s) 106, the digital survey system 104, and the survey knowledge graph system 102 may directly communicate with the administrator device 110, the respondent devices 108a-108n and/or the agent device 112, bypassing the network 114. Additionally, the survey knowledge graph system 102 or the digital survey system 104 may be part of another system or may be in communication with another system.

Figure 2:
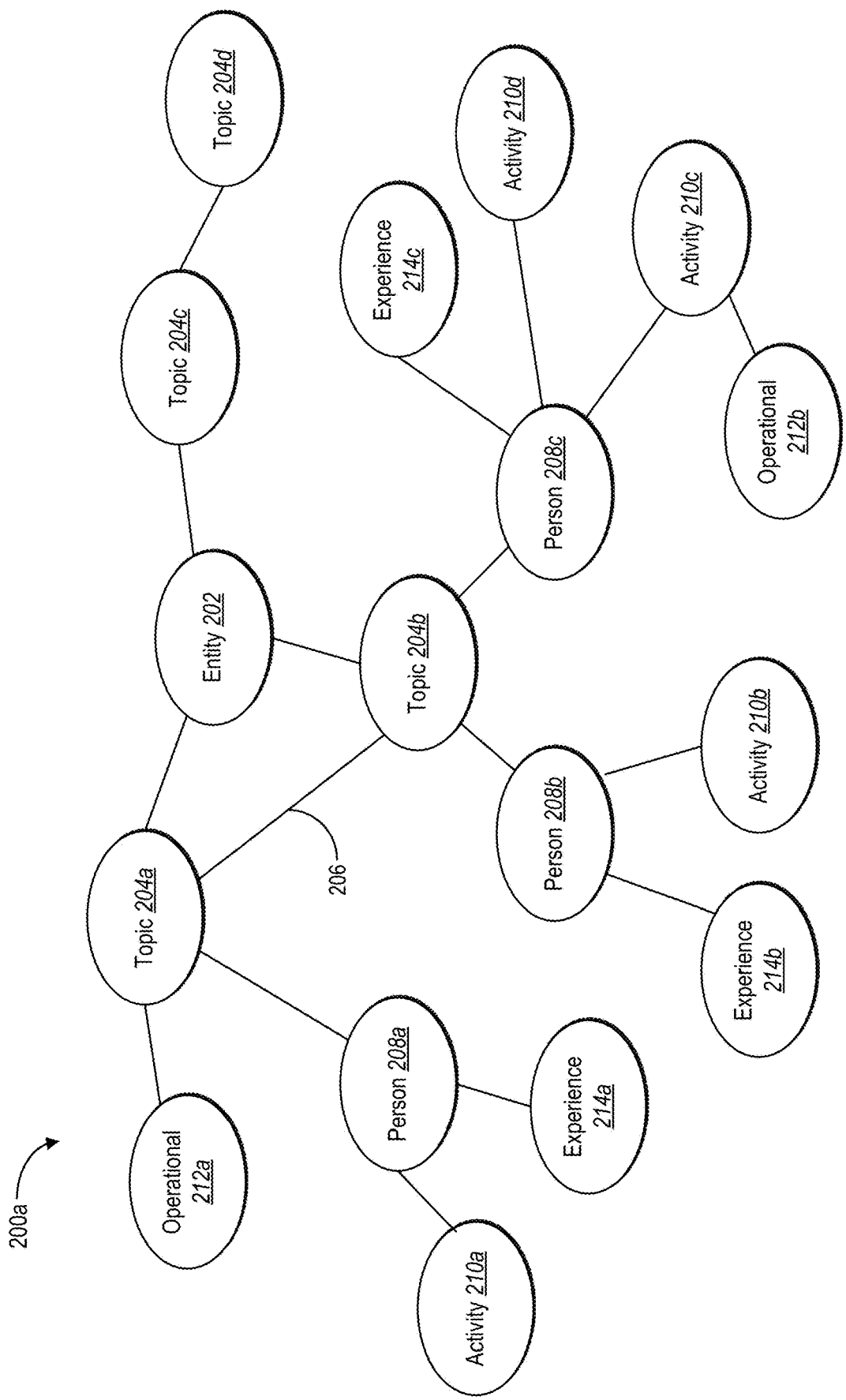
FIG. 2 illustrates a diagram of a knowledge graph including a plurality of nodes corresponding to a predefined ontology of topics, survey data, and data associated with respondents connected via edges indicating relationships between the nodes in accordance with one or more embodiments.

As noted above, the survey knowledge graph system 102 can generate a knowledge graph based on a predefined ontology of topics associated with one or more entities to organize survey data for electronic surveys. In particular, generating such a knowledge graph for survey data provides a consistent, usable storage structure. FIG. 2 illustrates an embodiment of a knowledge graph 200 including a plurality of nodes representing topics and other data points connected by a plurality of edges. Specifically, FIG. 2 illustrates nodes representing a plurality of different types of data points connected by edges based on a predefined topic ontology corresponding to at least one entity and survey data for a plurality of respondents of an electronic survey.

As shown in FIG. 2, the survey knowledge graph system 102 generates the knowledge graph 200 based on a predefined ontology of topics. In one or more embodiments, the predefined ontology of topics includes a set of topics that the survey knowledge graph system determines in connection with one or more entities (e.g., an entity represented by an entity node 202 in FIG. 2). In particular, the survey knowledge graph system 102 determines the topics by establishing a single group of topics with known definitions (e.g., a data dictionary or schematization) associated with, but not limited to, products, services, or events in connection with the one or more entities. For instance, the survey knowledge graph system 102 can determine the topics based on historical data associated with the one or more entities including historical survey data. To illustrate, a topic can include, but is not limited to, locations or geographical region, name or identifier, a particular service or product, or a particular attribute of a service or product.

In one or more embodiments, the survey knowledge graph system 102 generates nodes for each of the topics. Specifically, as illustrated in FIG. 2, the survey knowledge graph system 102 generates a plurality of topic nodes 204a-204d corresponding to the topics in the predefined ontology of topics. Additionally, in some embodiments, the survey knowledge graph system 102 also generates one or more edges (e.g., edge 206) between the topic nodes 204a-204d and/or the entity node 202. To illustrate, the survey knowledge graph system 102 can generate the edges based on known or inferred relationships between the topics of the predefined ontology of topics. As illustrated in FIG. 2, in some embodiments, the survey knowledge graph system 102 determines that one or more topic nodes are leaf nodes to other topic nodes (e.g., topic node 204d is a leaf node to topic node 204c).

According to one or more additional embodiments, the survey knowledge graph system 102 also determines information associated with a plurality of users to insert into the knowledge graph 200. For example, the survey knowledge graph system 102 determines information identifying users associated with the entity such as customers, users, subscribers, individuals with user accounts. The survey knowledge graph system 102 can then generate a plurality of person nodes 208a-208c including information about the identified users. To illustrate, the survey knowledge graph system 102 can determine and store identification information, contact information, demographic information, education level, or other information about a user with a corresponding person node. In one or more embodiments, the survey knowledge graph system 102 determines user information based on survey data received for a user or from other sources (e.g., extended metadata based on touchpoints between entities and users) provided by one or more systems).

Furthermore, as illustrated in FIG. 2, the survey knowledge graph system 102 connects the person nodes 208a-208c to the topic nodes 204a-204d within the knowledge graph 200. Specifically, the survey knowledge graph system 102 can determine that a user is related to a particular topic associated with an entity based on the information stored in the person node for the user and/or additional information about the user. To illustrate, in response to determining that a particular user is associated with an entity by way of the user being subscribed to a particular service, having purchased a particular product, or otherwise has data associated with the person node for the user indicating a relationship to the entity, the survey knowledge graph system 102 can generate an edge between the person node (e.g., person node 208b) and a corresponding topic node (e.g., topic node 204b). In some embodiments, the survey knowledge graph system 102 determines that a given person node is connected to a plurality of topic nodes and generates a plurality of edges to indicate such relationships.

Additionally, FIG. 2 illustrates that the survey knowledge graph system 102 also determines activity information associated with users. In one or more embodiments, the survey knowledge graph system 102 determines activities that a user has performed in connection with an entity based on survey data, user account history, data associated with user actions associated with an entity or topic (e.g., chat histories associated with the entity or topic, call recordings for calls involving the entity or topic, social media postings interacting or including information about the entity or topic) or other data indicating that the user has performed specific actions. The survey knowledge graph system 102 can then generate a plurality of activity nodes 210a-210d corresponding to the identified transactions and connect the activity nodes 210a-210d to corresponding person nodes via edges. FIG. 2 illustrates, for example, activity node 210c and activity node 210d connected to person node 208c based on the user corresponding to person node 208c engaging in transactions associated with activity node 210c and activity node 210d.

In one or more embodiments, transactions include, but are not limited to, product purchases, service purchases, or events attended/experienced. In some instances, the survey knowledge graph system 102 determines a transaction by accessing a user profile or user account associated with a user. In additional embodiments, the survey knowledge graph system 102 determines a transaction based on survey data associated with a transaction (e.g., for an electronic survey administered based on the transaction).

Additionally, the survey knowledge graph system 102 can determine operational data associated with entities, activities, or other concepts in the knowledge graph 200. For example, operational data can include data that describes an entity, an activity, or a topic. To illustrate, operational data can describe details about a transaction, such as a location of purchase of a particular product, color of the purchased product, etc. Alternatively, operational data can describe an entity associated with a particular topic ontology such as a description of an entity's area of operation, workforce, suppliers, or other details about an entity that are not covered by the topic ontology or data about the user nodes. In any case, as illustrated in FIG. 2, the survey knowledge graph system 102 generates operational nodes 212a-212b corresponding to the operational data and connects the operational nodes 212a-212b within the knowledge graph 200 accordingly. More specifically, the survey knowledge graph system 102 connects an operational node 212a to a topic node 204a based on operational data for a corresponding topic and an operational node 212b to the activity node 210c based on operational data for a corresponding activity.

FIG. 2 further illustrates that the survey knowledge graph system 102 generates experience nodes 214a-214c including experience data corresponding to electronic surveys. In particular, in response to receiving survey data for an electronic survey administered to a plurality of respondent devices, the survey knowledge graph system 102 determines experience data that describes responses to electronic survey questions of the electronic survey. For instance, the survey knowledge graph system 102 determines respondent feedback such as ratings, opinions, sentiment, emotion, or other responses that indicate experiences of users with activities or topics. Additionally, the survey knowledge graph system 102 can determine at least some experience data from implied experiences associated with user interactions or transactions in connection with the entity (e.g., based on detected patterns in the user interactions or transactions).

Once the survey knowledge graph system 102 has generated the knowledge graph 200 including data associated with a predefined ontology of topics and data from a plurality of different datasets (e.g., identifying information, activity information, operational information, and experience information associated with a plurality of respondents of an electronic survey), the survey knowledge graph system 102 can utilize the knowledge graph to perform additional operations. For example, the survey knowledge graph system 102 can crawl the knowledge graph 200 to access data from a plurality of different nodes to perform various operations on the data. To illustrate, the survey knowledge graph system 102 generates digital benchmarks by inferring relationships between data according to the nodes and edges in the knowledge graph 200 and then comparing data based on the inferred relationships. Furthermore, the survey knowledge graph system 102 can access data from the knowledge graph 200 in connection with an interaction (e.g., a call or chat) between a user corresponding to a person node and another person (e.g., an agent).

Additionally, in one or more embodiments, the survey knowledge graph system 102 to determine user segments from the knowledge graph 200. For instance, the survey knowledge graph system 102 determines a set of person nodes from the knowledge graph 200 based on one or more common data points associated with the person nodes. To illustrate, the survey knowledge graph system 102 utilizes inferred relationships to determine user segments based on edges connecting the person nodes to a particular topic node, experience node, activity node, etc. Furthermore, the survey knowledge graph 102 determines user segments based additionally on information stored within the person nodes or other nodes connected to the person nodes.

In one or more embodiments, the survey knowledge graph system 102 utilizes a graph neural network to construct and utilize a knowledge graph. Specifically, the survey knowledge graph system 102 can utilize a graph neural network to learn weights associated with the edges between nodes in the knowledge graph 200. For instance, the survey knowledge graph system 102 utilizes a graph neural network including a deep learning model, a convolutional neural network, and/or a recurrent neural network comprising a plurality of nodes corresponding to the data types indicated above. Additionally, the survey knowledge graph system 102 can train the graph neural network to capture dependencies (e.g., edge weights) between the nodes for use in making inferences or performing other operations, as indicated above. To illustrate, the survey knowledge graph system 102 uses training data such as historical activity data, experience data (e.g., based on historical survey data), and/or historical benchmarking data to determine the edges between the nodes. In one or more embodiments, the survey knowledge graph system 102 also generates a prediction (e.g., a predicted topic, a predicted feature, or another prediction) using the weights/nodes of a survey knowledge graph (e.g., via one or more prediction layers). The survey knowledge graph system 102 can also learn parameters of the prediction layer(s) based on the prediction (e.g., by comparing the prediction to a ground-truth value related to the prediction).

Although FIG. 2 illustrates a specific configuration of nodes within a knowledge graph, the survey knowledge graph system 102 can generate a knowledge graph with a variety of configurations of nodes, node types, and edges between nodes. For example, the survey knowledge graph system 102 can generate a knowledge graph with certain types of data as attributes or annotations to nodes. To illustrate, the survey knowledge graph system 102 can include attributes indicating that certain nodes include private or protected information or an expiration date for the information within the node. Alternatively, the survey knowledge graph system 102 can generate a knowledge graph with specific types of data as leaf nodes to other nodes instead of as attributes or annotations to the nodes.

In addition, the survey knowledge graph system 102 can generate a variety of numbers of edges to a particular node to link the node to other types of node based on a learned or inferred relationship between the nodes. For example, the survey knowledge graph system 102 can determine that a person node is associated with a plurality of different topic nodes based on a transaction history or experience history of a user of the person node. The survey knowledge graph system 102 can then generate a plurality of edges between the person node and the plurality of topic nodes. In such a manner, the survey knowledge graph system 102 can link nodes to different numbers of other nodes.

The survey knowledge graph system 102 can then use the trained graph neural network with nodes and edges to make predictions and inferences according to the learned edge weights, such as in benchmarking different sets of data. For instance, the survey knowledge graph system 102 can use the learned edge weights (e.g., via a convolutional layer on top of the graph neural network) to determine that one or more edges between nodes indicates a specific relationship. To illustrate, the survey knowledge graph system 102 can determine that an edge between a particular experience node and a topic node corresponding to a product indicates a particular sentiment for the product by a particular respondent or group of respondents. The graph neural network can thus increase the accuracy and flexibility of the survey knowledge graph system 102 in determining inferences from survey data and other data inserted into the knowledge graph.

As mentioned, the survey knowledge graph system 102 can determine a predefined ontology of topics in connection with one or more entities. In some embodiments, the survey knowledge graph system 102 determines a topic ontology in connection with a single entity by determining a plurality of topics defined for the entity. In alternative embodiments, the survey knowledge graph system 102 determines the topic ontology in connection with the single entity by modifying the plurality of topics defined for the entity according to an ontology associated with the survey knowledge graph system 102. In additional embodiments, the survey knowledge graph system 102 can modify the predefined ontology of topics upon receiving additional information from one or more of the entities and then update the knowledge graph accordingly (e.g., by adding or removing topic nodes and updating edges).

Figure 3:
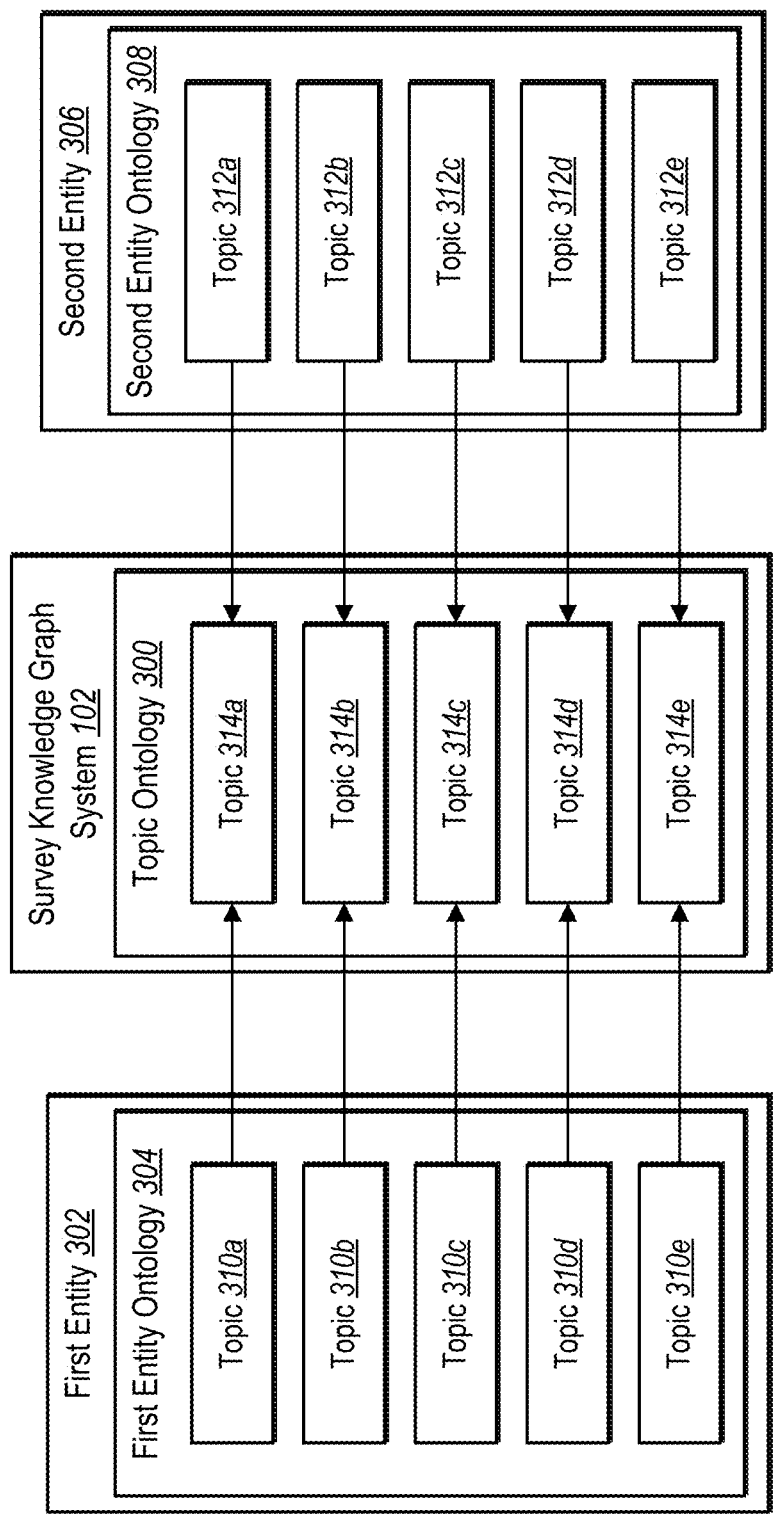
FIG. 3 illustrates a diagram of the survey knowledge graph system determining a topic ontology from sets of topics associated with a plurality of different entities in accordance with one or more embodiments.

In one or more embodiments, the survey knowledge graph system 102 determines a predefined ontology of topics for a plurality of entities. FIG. 3 illustrates that the survey knowledge graph system 102 determines a topic ontology 300 in connection with a plurality of entities. Specifically, the survey knowledge graph system 102 generates the topic ontology 300 from a plurality of topic ontologies associated with the plurality of entities. More specifically, the survey knowledge graph system 102 determines sets of topics for the entities according to topic definitions and terminologies of the entities.

As illustrated in FIG. 3, the survey knowledge graph system 102 communicates with a first entity 302 (e.g., a system or device associated with the first entity 302) to determine a first entity ontology 304 corresponding to the first entity 302. For instance, the survey knowledge graph system 102 receives a plurality of topics 310a-310e from the first entity 302. In one or more embodiments, the plurality of topics 310a-310e include terminology, definitions, and usage of concepts associated with the first entity 302. As an example, the first entity 302 may use a particular term to describe a particular product or group of products. The survey knowledge graph system 102 can then determine a topic corresponding to the term used for the product or group of products by the first entity 302.

As further illustrated in FIG. 3, the survey knowledge graph system 102 communicates with a second entity 306 (e.g., a system or device associated with the second entity 306) to determine a second entity ontology 308 corresponding to the second entity 306. For example, the survey knowledge graph system 102 receives a plurality of topics 312a-312e from the second entity 306. According to one or more embodiments, the plurality of topics 312a-312e include terminology, definitions, and usage of concepts associated with the second entity 306. To illustrate, the second entity 306 can use a different term to describe a product or group of products than the first entity 302. The survey knowledge graph system 102 can also determine a topic corresponding to the term used for the product or group of products by the second entity 306.

Before, after, or otherwise in connection with receiving the first entity ontology 304 from the first entity 302 and the second entity ontology 308 associated with the second entity 306, the survey knowledge graph system 102 generates the topic ontology 300. In particular, in one or more embodiments, the survey knowledge graph system 102 determines a plurality of topics 314a-314e to represent the topics in each of the first entity ontology 304 and the second entity ontology 308. For instance, the survey knowledge graph system 102 determines a topic (e.g., predefined term or data dictionary entry) that represents each topic in the first entity ontology 304 and the second entity ontology 308. Thus, while the first entity 302 and the second entity 306 may use different terminology to represent the same concept, the survey knowledge graph system 102 can determine a single topic to represent all terminologies of the same concept. To illustrate, the survey knowledge graph system 102 can determine that topic 314a represents topic 310a from the first entity ontology 304 and topic 312a from the second entity ontology 308.

According to one or more embodiments, the survey knowledge graph system 102 determines the plurality of topics 314a-314e by utilizing language processing techniques. For example, the survey knowledge graph system 102 utilizes natural language processing to determine similar topics across the different ontologies. Additionally, the survey knowledge graph system 102 can utilize information about the topics (e.g., definitions) to identify correspondences between the topics. The survey knowledge graph system 102 can further generate (or identify) topics to create a shared definition with a known meaning according to the identified correspondences. In some embodiments, the survey knowledge graph system 102 also determines topics in the topic ontology 300 for topics that do not overlap across the first entity ontology 304 and the second entity ontology 308 (e.g., for a topic in the first entity ontology 304 that does not have a corresponding topic in the second entity ontology 308).

In one or more embodiments, the survey knowledge graph system 102 adds one or more additional topics in the topic ontology 300 in connection with a knowledge graph based on the topic ontology 300. In particular, the survey knowledge graph system 102 can determine that a new topic (e.g., from a new entity or a new customer associated with an existing entity) relates to an existing topic in the topic ontology 300. For instance, the survey knowledge graph system 102 can generate a new node for the new topic and connect the new node to the knowledge graph with one or more edges to additional nodes. To illustrate, the survey knowledge graph system 102 can determine edges within the knowledge graph and crawl the edges to the nearest existing topic based on the contents of the connecting nodes and relationships between nodes indicated by the edges. In some embodiments, the survey knowledge graph system 102 identifies similarities in patterns between nodes associated with the new topic and patterns between nodes associated with an existing topic (e.g., a first topic for a first entity is the same as a second topic for a second entity).

Figure 4A:
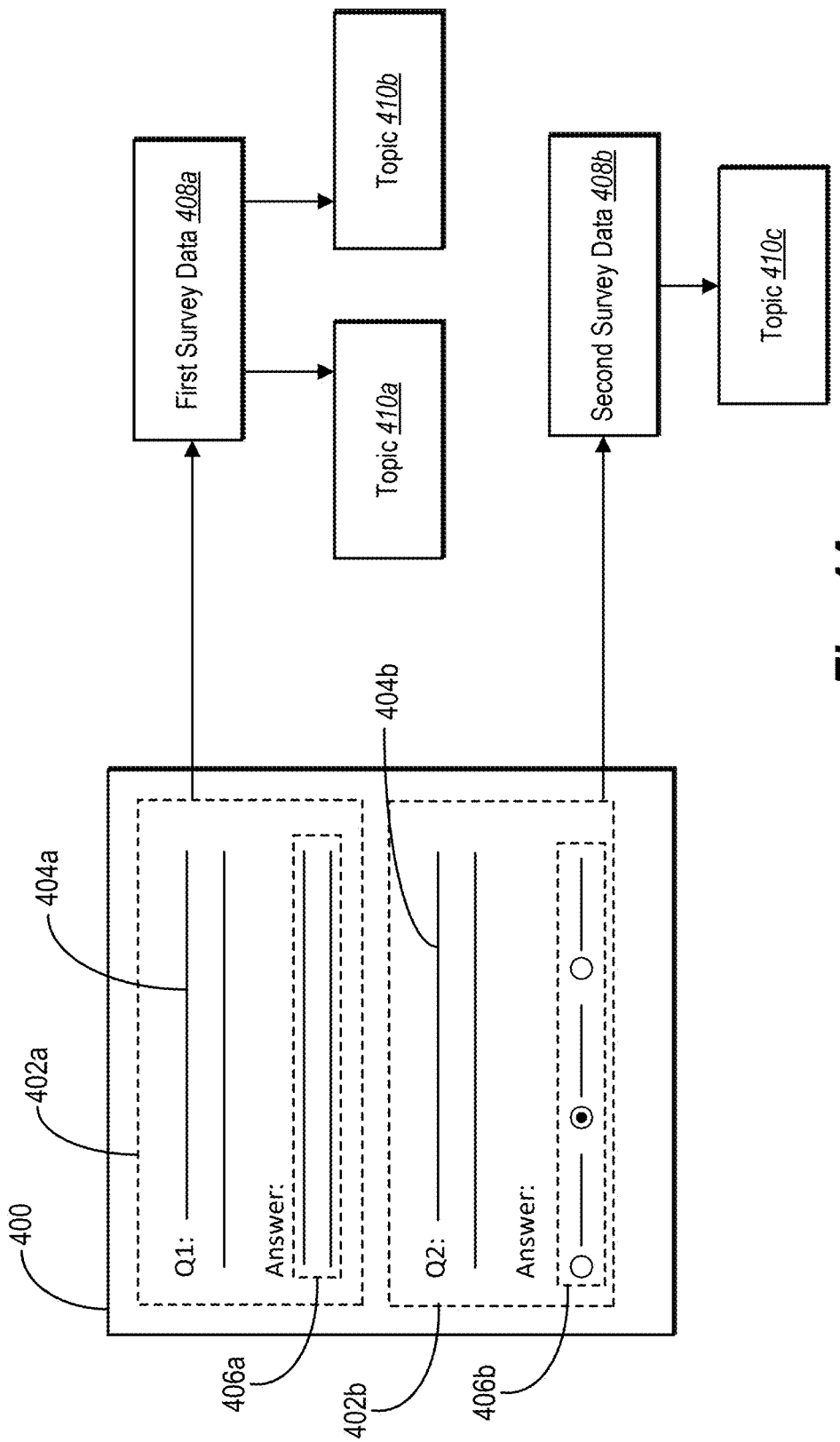
FIG. 4A illustrates a diagram of the survey knowledge graph system extracting topics from survey data corresponding to electronic survey questions of an electronic survey in accordance with one or more embodiments.

As mentioned previously, the survey knowledge graph system 102 can determine topics associated with electronic surveys administered to a plurality of respondents and use the determined topics to insert survey data into a knowledge graph. For example, FIG. 4A illustrates that the survey knowledge graph system 102 determines survey data for an electronic survey. FIG. 4A also illustrates that the survey knowledge graph system 102 extracts topics from the survey data for connecting the survey data to a predefined ontology of topics.

As illustrated in FIG. 4A, the survey knowledge graph system 102 administers an electronic survey 400 (or otherwise determines that another system administers the electronic survey 400) to at least one respondent device. In one or more embodiments, the electronic survey 400 includes a plurality of electronic survey questions related to one or more entities and/or one or more topics. For example, the electronic survey 400 includes a first electronic survey question 402a and a second electronic survey question 402b. In some embodiments, an electronic survey may include any number of electronic survey questions administered to any number of respondent devices.

FIG. 4A also illustrates that an electronic survey question includes a question portion and an answer portion. Specifically, the first electronic survey question 402a includes a first question portion 404a and a first answer portion 406a. Additionally, the second electronic survey question 402b includes a second question portion 404b and a second answer portion 406b. More specifically, a question portion can include a text prompt, image prompt, video prompt, and/or audio prompt to invoke a response from a respondent. Additionally, an answer portion can include a text input field, radio buttons, multiple choice inputs, dropdown box, slider input, or other type of input that allows a respondent to interact with the answer portion via a respondent device.

In one or more embodiments, the survey knowledge graph system 102 obtains data associated with an administered electronic survey. In particular, the survey knowledge graph system 102 can obtain survey data corresponding to a plurality of electronic survey questions in an electronic survey. As illustrated in FIG. 4A, for example, the survey knowledge graph system 102 obtains first survey data 408a for the first electronic survey question 402a and second survey data 408b for the second electronic survey question 402b.

In at least some embodiments, the survey knowledge graph system 102 determines the first survey data 408a for the first electronic survey question 402a based on the first question portion 404a and the first answer portion 406a. Specifically, the survey knowledge graph system 102 determines the first survey data 408a to include the contents of the first question portion 404a and the first answer portion 406a including text, images, question/answer types, and/or metadata. Additionally, the survey knowledge graph system 102 can determine that the first survey data 408a includes response data for the first electronic survey question 402a received from a respondent device. The survey knowledge graph system 102 similarly determines the second survey data 408b for the second electronic survey question 402b based on the second question portion 404b and the second answer portion 406b.

Furthermore, the survey knowledge graph system 102 extracts topics from survey data associated with an electronic survey. In particular, the survey knowledge graph system 102 analyzes the first question portion 404a to determine whether the first question portion 404a refers to or is otherwise related to one or more topics (e.g., one or more new topics or one or more previously defined topics, such as entity-defined topics or a generalized set of topics as illustrated in FIG. 3). The survey knowledge graph system 102 also analyzes the first answer portion 406a (e.g., based on response data associated with the first answer portion 406a) to determine whether the first answer portion 406a refers to or is otherwise related to one or more topics. Similarly, the survey knowledge graph system 102 determines the second survey data 408b for the second electronic survey question 402b by analyzing the second question portion 404b and the second answer portion 406b. The survey knowledge graph system 102 also utilizes the second survey data 408b to determine whether the second survey data 408b refers to or is otherwise related to one or more topics. To illustrate, the survey knowledge graph system 102 extracts a first topic 410a and a second topic 410b from the first survey data 408a associated with the first electronic survey question 402a and a third topic 410c from the second survey data 408b associated with the second electronic survey question 402b.

According to one or more embodiments, the survey knowledge graph system 102 utilizes keyword searching/matching to extract topics from survey data. For instance, the survey knowledge graph system 102 can determine a list of words or phrases associated with a predefined ontology of topics including, but not limited to, words or phrases in the topics, synonyms, or related words/phrases. The survey knowledge graph system 102 can then determine whether a question portion or an answer portion for an electronic survey question includes (e.g., explicitly recites) any of the words/phrases in the determined list of words or phrases. If the survey knowledge graph system 102 determines that the survey data for an electronic survey question includes any of the identified words/phrases, the survey knowledge graph system 102 extracts the topics from the electronic survey question.

In some embodiments, the survey knowledge graph system 102 utilizes natural language processing to analyze survey data. For example, the survey knowledge graph system 102 can utilize natural language processing to analyze text responses from response data. More specifically, by processing text response data (e.g., unstructured text) utilizing natural language processing, the survey knowledge graph system 102 can identify topics based on words or phrases in the response data in addition to contextual information. Thus, the survey knowledge graph system 102 can analyze complex text to determine topics that are not explicitly recited in the text.

Figure 4B:
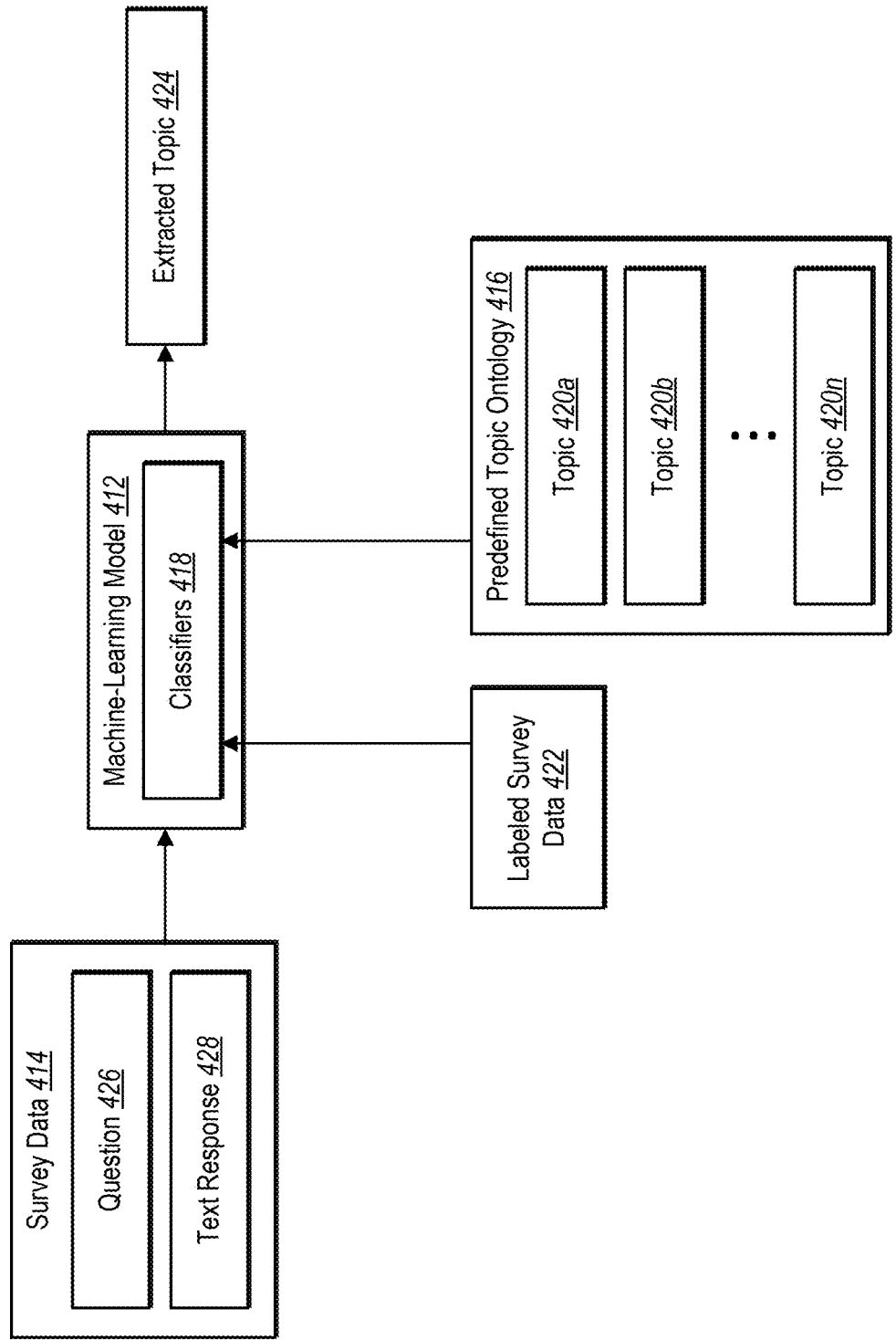
FIG. 4B illustrates a diagram of a machine-learning model extracting a topic from survey data using classifiers trained on a labeled data and a predefined topic ontology in accordance with one or more embodiments.

In additional embodiments, the survey knowledge graph system 102 utilizes machine-learning to extract topics from survey data. To illustrate, the survey knowledge graph system 102 utilizes a machine-learning model to analyze the survey data and extract topics from the survey data. Specifically, FIG. 4B illustrates that the survey knowledge graph system 102 utilizes a machine-learning model to extract topics from survey data for connecting to nodes corresponding to a predefined ontology of topics in a knowledge graph. For instance, the survey knowledge graph system 102 utilizes a machine-learning model trained on data corresponding to the predefined ontology of topics.

As illustrated in FIG. 4B, the survey knowledge graph system 102 utilizes a machine-learning model 412 to process survey data 414 associated with an electronic survey. In particular, the machine-learning model 412 includes classifiers for classifying content of the survey data 414 according to topics in a predefined topic ontology 416 associated with one or more entities. For instance, the machine-learning model 412 can include the classifiers 418 corresponding to topics 420a-420n in the predefined topic ontology 416 for classifying text associated with electronic survey questions.

As illustrated, in one or more embodiments, the survey knowledge graph system 102 trains the classifiers 418 by utilizing labeled survey data 422. To illustrate, the survey knowledge graph system 102 obtains the labeled survey data 422 including manually labeled instances of text responses corresponding to electronic surveys. For example, the labeled survey data 422 can include historical response data received from a plurality of respondent devices in connection with electronic surveys associated with the topics 420a-420n. Accordingly, the labeled survey data 422 can thus include manually labeled historical response data for words, phrases, or other content of the response data that indicates the topics 420a-420n of the predefined topic ontology 416.

After training the classifiers 418 of the machine-learning model 412, the survey knowledge graph system 102 can utilize the machine-learning model 412 to analyze the survey data 414 and extract one or more topics. Specifically, the machine-learning model 412 receives the survey data 414 and generates an extracted topic 424 based on the survey data 414. For instance, as illustrated in FIG. 4B, the survey data 414 includes a question 426 and a text response 428. The survey knowledge graph system 102 can then utilize the classifiers 418 to generate the extracted topic 424 by analyzing the question 426 and the text response 428.

Figure 5:
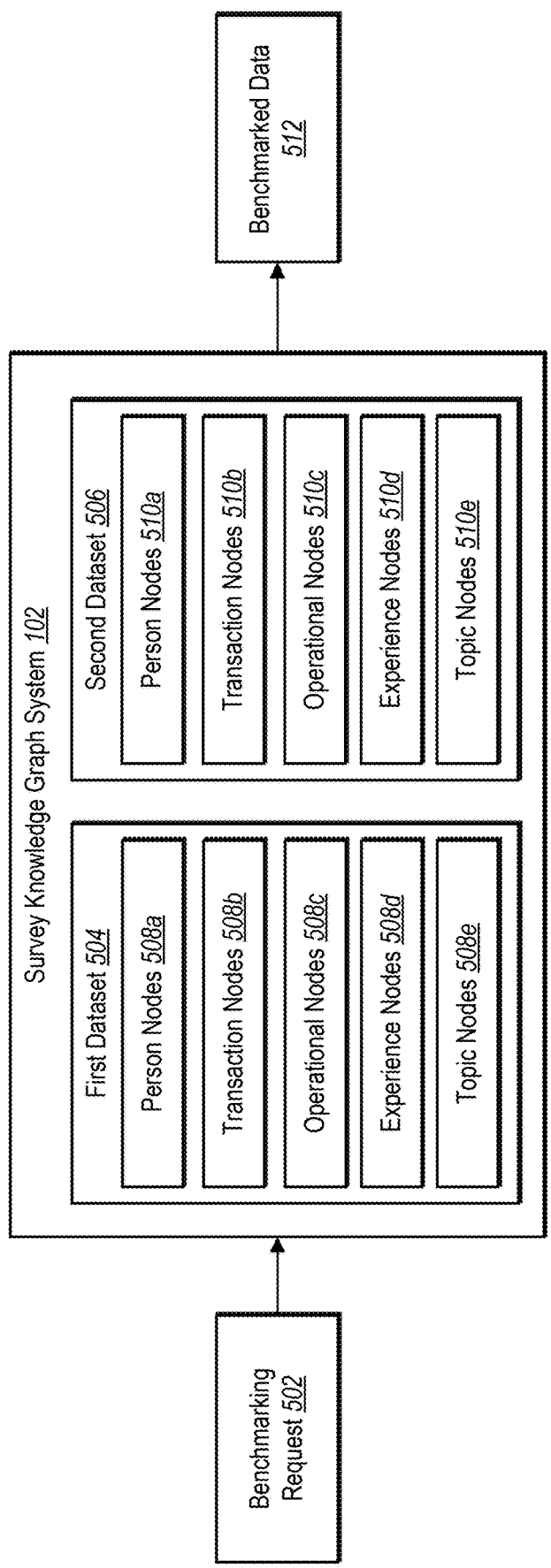
FIG. 5 illustrates a diagram of the survey knowledge graph system generating a digital benchmark between two datasets in accordance with one or more embodiments.

As previously mentioned, the survey knowledge graph system 102 can perform various operations utilizing a knowledge graph that incorporates survey data according to a predefined ontology of topics. For example, FIG. 5 illustrates that the survey knowledge graph system 102 generates a digital benchmark for a plurality of different datasets utilizing the knowledge graph. In particular, the survey knowledge graph system 102 compares the datasets by utilizing nodes and edges in the knowledge graph to make inferences about the datasets. Additionally, by integrating survey data into a knowledge graph with additional, detailed information about respondents according to a predefined ontology of topics, the survey knowledge graph system 102 can generate detailed benchmarks of datasets by linking the datasets to the predefined ontology of topics, which provides access to individual records resulting in detailed/protected benchmarks.

As illustrated in FIG. 5, the survey knowledge graph system 102 receives a benchmarking request 502 to benchmark a first dataset 504 to a second dataset 506 by comparing data in the datasets utilizing a knowledge graph. To illustrate, the survey knowledge graph system 102 receives a request to compare datasets associated with a specific topic. For instance, the survey knowledge graph system 102 can receive a request to compare performance, customer sentiment, or other information associated with a particular product for a plurality of entities. The survey knowledge graph system 102 can then crawl the knowledge graph to make inferences about the product in the first dataset 504 and the second dataset 506 based on information according to nodes and edges in the knowledge graph.

In particular, the survey knowledge graph system 102 determines the first dataset 504 and the second dataset 506 by identifying a plurality of nodes based on the benchmarking request 502. More specifically, the survey knowledge graph system 102 determines a first set of person nodes 508a, transaction nodes 508b, operational nodes 508c, experience nodes 508d, and/or topic nodes 508e based on relationships associated with a topic indicated in the benchmarking request 502. The survey knowledge graph system 102 also determines a second set of person nodes 510a, transaction nodes 510b, operational nodes 510c, experience nodes 510d, and/or topic nodes 510e associated with the second dataset 506 based on relationships associated with the topic indicated in the benchmarking request 502.

To illustrate, the survey knowledge graph system 102 can receive a request to compare a sentiment of users of a particular product associated with a first entity to a sentiment of users of a similar product associated with a second entity. In response to the request, the survey knowledge graph system 102 can access nodes and determine relationships between the nodes in connection with the first entity and the second entity. The survey knowledge graph system 102 can then compare the data in the nodes according to the relationships and strengths of the relationships to generate benchmarked data 512. Because the survey knowledge graph system 102 utilizes the knowledge graph to generate benchmarked data 512, the survey knowledge graph system 102 utilizes relationships captured by the edges (and corresponding weights) between the nodes in each dataset to compare the datasets. This allows the survey knowledge graph system 102 to make inferences at a fine level of detail that would otherwise be impossible or very difficult with a flat database (e.g., a table).

As a specific example, the request can include a request to compare patient sentiment associated with different medical facilities. By crawling the knowledge graph, the survey knowledge graph system 102 can determine, for instance, that medical facilities with pediatrics and oncology departments tend to have higher patient sentiments than facilities with no (or only one of) pediatrics or oncology departments. In another example, the survey knowledge graph system 102 can determine whether one gender tends to respond about oncology visits differently (e.g., with higher or lower sentiments) than other genders. Other examples of benchmarking requests can include comparing products with specific details based on location-such as a comparison of customer satisfaction related to a particular brand and color of shoe in one geographic region to another geographic region.

According to one or more embodiments, the survey knowledge graph system 102 utilizes a knowledge graph including a plurality of nodes and edges to make inferences for generating digital benchmarks for datasets. For instance, the survey knowledge graph system 102 receives a request to generate a digital benchmark for a first dataset and a second dataset corresponding to a particular topic. The survey knowledge graph system 102 can identify a node associated with a specific topic and access a plurality of nodes connected via one or more edges. To illustrate, the survey knowledge graph system 102 determines a plurality of nodes associated with a topic node by identifying leaf nodes directly connected to the node or indirectly connected. As mentioned previously, the leaf nodes can include, but are not limited to, person nodes, activity nodes, or experience nodes to the identified node. Accordingly, the survey knowledge graph system 102 can access leaf user nodes, leaf activity nodes, leaf experience nodes, etc., for a plurality of datasets based on connections of the nodes to a specific topic node.

Additionally, the survey knowledge graph system 102 determines attributes of the datasets based on the connected nodes and edges and then compares the attributes of the datasets. In some embodiments, the survey knowledge graph system 102 determines the attributes based on inferences related to the datasets. For example, the survey knowledge graph system 102 can utilize information in the nodes and learned edge weights in the knowledge graph to make inferences about each dataset. More specifically, the inferences can include information determined from survey data and/or other data (e.g., by leveraging the knowledge graph structure) that may not have been explicitly indicated in the survey data or other data.

Figure 6:
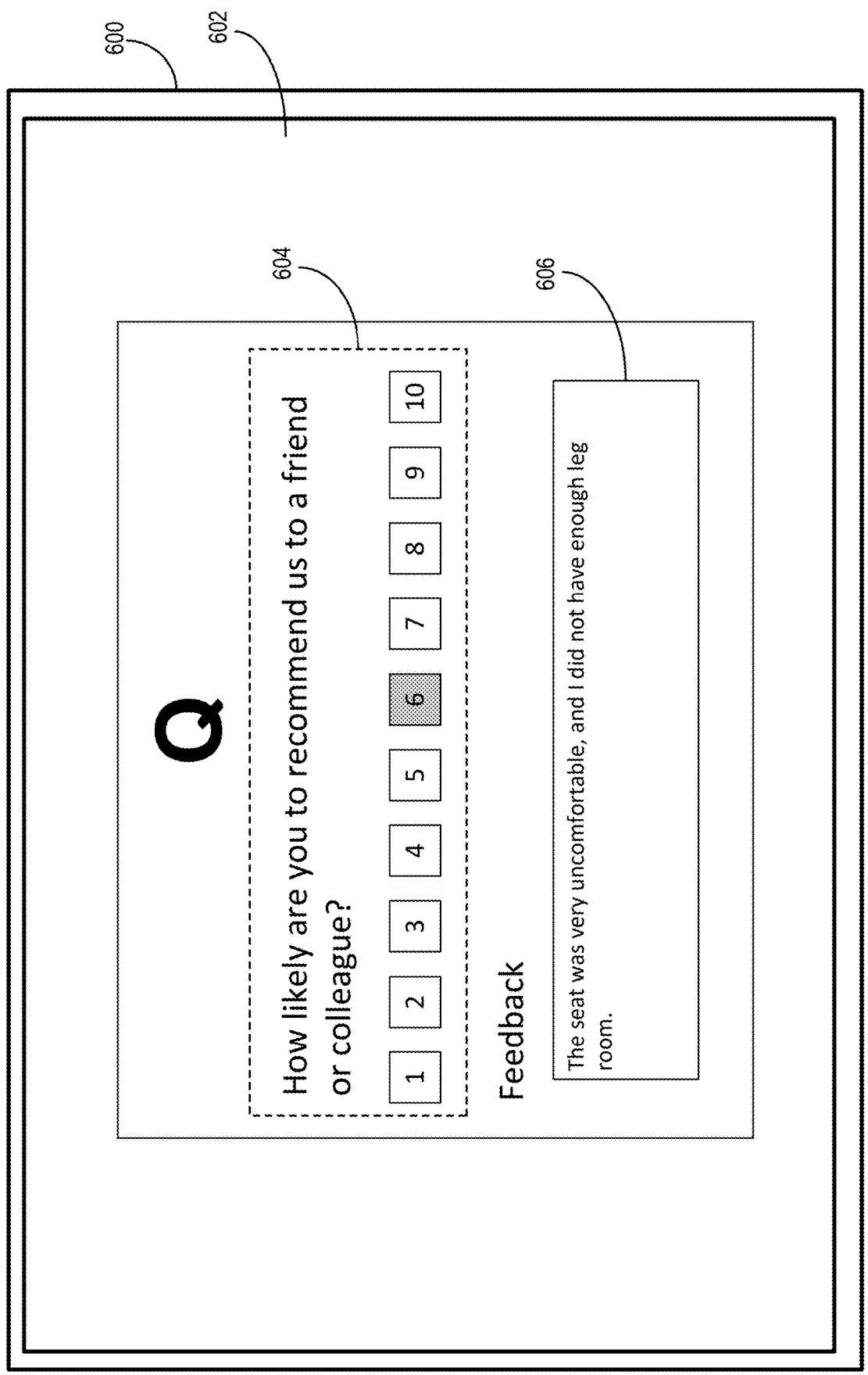
FIG. 6 illustrates a graphical user interface of an electronic survey question and a response to the electronic survey question in accordance with one or more embodiments.

In one or more embodiments, the survey knowledge graph system 102 can operate in connection with a digital survey system (e.g., the digital survey system 104 of FIG. 1) to administer an electronic survey to a respondent device. In accordance with one or more embodiments, FIG. 6 illustrates a respondent device 600 presenting a graphical user interface for administering an electronic survey to a respondent. In particular, FIG. 6 illustrates that the respondent device 600 includes a client application 602 that allows a respondent to provide response data for an electronic survey. In one or more embodiments, the client application 602 includes a web browser that accesses a URL for the electronic survey via a network connection. The respondent can use the web browser to navigate and interact with questions within the electronic survey.

As illustrated in FIG. 6, the electronic survey includes at least a first question 604 and a second question 606. For example, the respondent device 600 displays the first question 604 requesting a respondent to indicate how likely the respondent would be to recommend an entity (e.g., a service provider) to another individual. The respondent device 600 can detect an input selecting an element indicating how likely the respondent is to recommend the entity to another individual. The respondent device 600 can generate response data including a value for the element in connection with survey data corresponding to the first question 604.

Additionally, the respondent device 600 displays the second question 606 that requests that the respondent provide more detailed feedback within a text input portion, if the respondent so desires. To illustrate, a respondent can type text into the text input portion to provide an unstructured response to the second question 606. As illustrated in FIG. 6, the respondent device 600 displays a text response including a user sentiment associated with an experience of the respondent in connection with the entity. In particular, FIG. 6 illustrates that the text response to the second question 606 includes the respondent's sentiment associated with a flight on which the respondent was a passenger.

As mentioned previously, the survey knowledge graph system 102 can analyze text responses to extract topics from the text responses. In one or more embodiments, the survey knowledge graph system 102 can determine that the text response to the second question 606 is related to seating in connection with a flight service (e.g., a particular airline or a particular airline route). Specifically, the survey knowledge graph system 102 can determine that the text response includes an explicit indication of a topic for seating. The survey knowledge graph system 102 can also determine that the text response corresponds to a flight service topic based on the electronic survey being administered in connection with the flight service or based on profile information associated with the respondent indicating that the electronic survey corresponds to the flight service. The survey knowledge graph system 102 can thus determine a plurality of topics associated with the second question 606 using the text response and context data associated with the text response.

Based on the text response, and based on other text responses for a plurality of other respondents, the survey knowledge graph system 102 can infer additional information about the topic (or topics). For example, the survey knowledge graph system 102 can utilize natural language processing and/or text sentiment analysis to process a plurality of text responses related to the seating topic and determine that a significant portion of the text responses indicate negative sentiment. The survey knowledge graph system 102 can then make an inference that text responses related to a seating topic for flight services tend to indicate negative sentiments. To illustrate, as previously indicated, the survey knowledge graph system 102 can access nodes directly or indirectly connected to a seating topic node in connection with flight services. The survey knowledge graph 102 can then make the inference based on the edge weights associated with the nodes and the data stored in the nodes.

Figure 7:
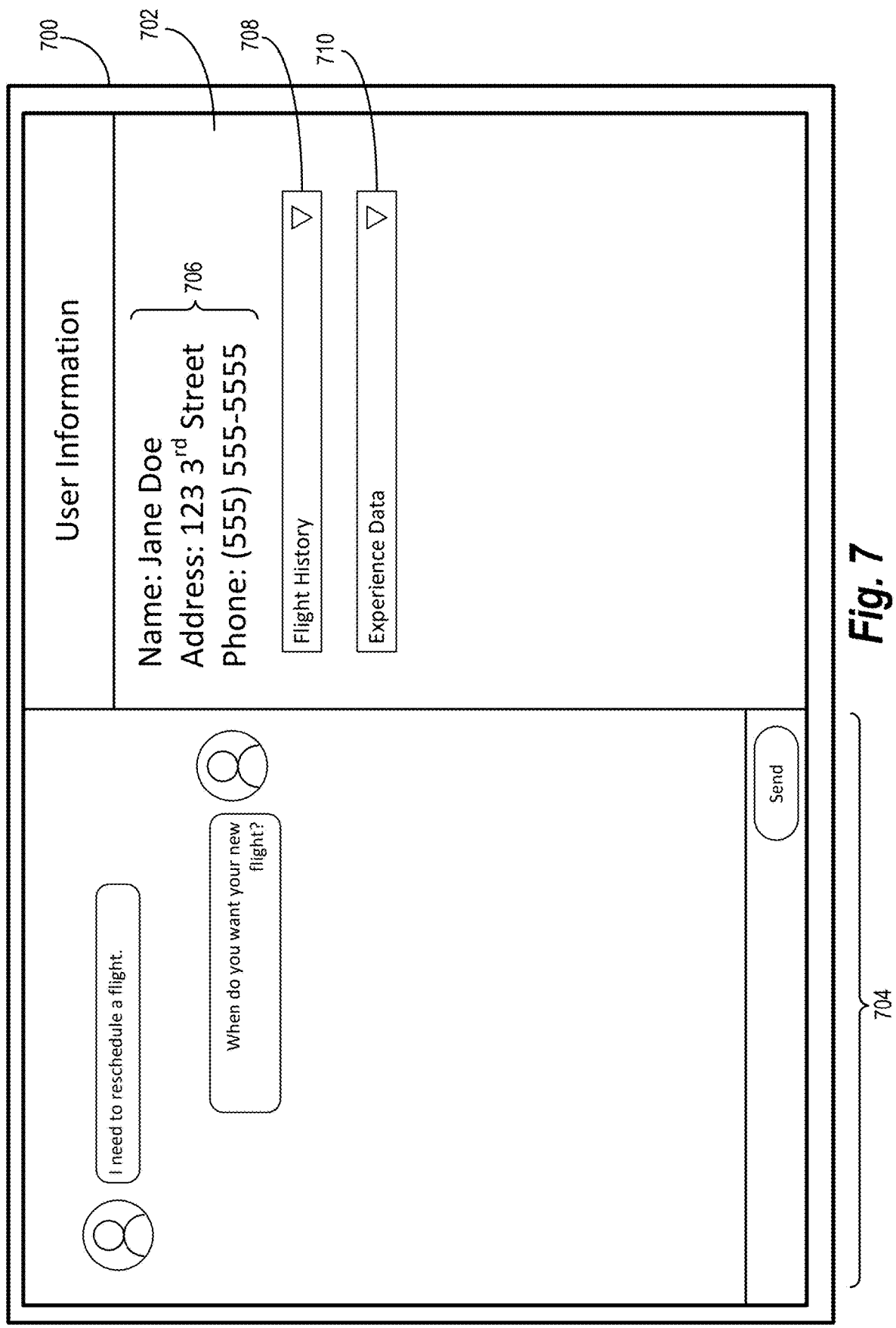
FIG. 7 illustrates a graphical user interface including an agent interaction with a user and user information extracted from a knowledge graph in accordance with one or more embodiments.

Additionally, as briefly mentioned previously, the survey knowledge graph system 102 can also provide detailed information by crawling a knowledge graph during a communication session. For example, the survey knowledge graph system 102 can utilize a knowledge graph that includes survey data connected to a predefined ontology of topics to obtain detailed information based on relationships captured in the nodes and edges of the knowledge graph. FIG. 7 illustrates an embodiment of an agent device 700 presenting a graphical user interface for assisting an agent of the agent device 700 in communicating with a user during a communication session between the agent and the user. FIG.

7 further illustrates that the agent device 700 also displays additional data associated with the user by accessing information from the knowledge graph during the communication session.

As illustrated in FIG. 7, the agent device 700 displays, within an agent application 702, one or more messages within a communication interface 704 associated with the live communication session between the agent and the user. For example, the communication interface 704 can include text messages or instant messages exchanged between the agent and the user during a support session involving the user. To illustrate, the communication interface 704 of FIG. 7 includes a support session in which a customer of an airline communicates with an agent of the airline to reschedule a flight.

Additionally, as mentioned, the survey knowledge graph system 102 can access the knowledge graph to obtain and display information during a communication session (e.g., a live communication session). In particular, the survey knowledge graph system 102 can determine an identity of the user involved in the communication session and then access a node in the knowledge graph corresponding to the user based on the determined identity. The survey knowledge graph system 102 can also access additional nodes connected to the node of the user based on a topic of the live communication session. To illustrate, the survey knowledge graph system 102 can access transaction data, operational data, and/or experience data associated with the user based on a topic node connected to the node of the user.

FIG. 7 illustrates, for example, that the survey knowledge graph system 102 obtains identifying information 706 for the user from the knowledge graph including, but not limited to, a user name, address, and contact information. Additionally, the survey knowledge graph system 102 can determine that the communication session corresponds to a particular topic (e.g., flight services) and then provide for display via the agent device 700 a transaction history element 708 including a transaction history associated with the user for the particular topic. In response to detecting an interaction with the transaction history element 708, the agent device 700 can display the transaction history (or a portion of the transaction history) for the user (e.g., in a dropdown menu, a popup interface, or in a separate interface).

FIG. 7 also illustrates that the agent device 700 displays an experience element 710 for displaying experience data corresponding to the user. More specifically, the survey knowledge graph system 102 utilizes the topic information for the communication session to access one or more experience nodes associated with the user via one or more edges connecting the experience node(s) to the user's node and the topic node for the topic of the communication session. In response to a selection of the experience element 710, the agent device 700 can display previous survey response data or feedback provided by the user in connection with one or more electronic surveys administered to the user. In some embodiments, the survey knowledge graph system 102 can also provide benchmarking data that compares the user to other similar users or peers based on data for the user and other users in the knowledge graph. The agent of the agent device 700 can thus view (e.g., without manually requesting or providing inputs such as filters to the survey knowledge graph system 102) relevant and detailed information about the user (e.g., to determine a sentiment of the user related to the communication session) for use during the communication session.

Although FIG. 7 illustrates that the survey knowledge graph system 102 provides data from a knowledge graph during a communication session between an agent and a user, the survey knowledge graph system 102 can also provide data from a knowledge graph in connection with other scenarios. For example, the survey knowledge graph system 102 can crawl a knowledge graph in connection with a future communication session (or possible communication session). To illustrate, the survey knowledge graph system 102 can provide information about a user and/or experience for a follow-up communication session.

Figure 8:
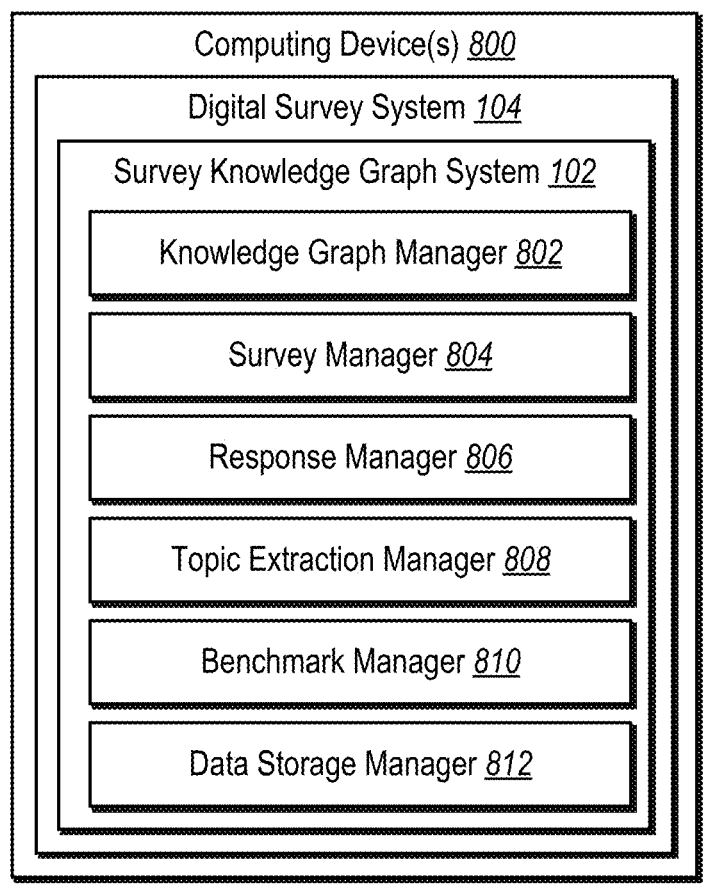
FIG. 8 illustrates a block diagram of the system environment of FIG. 1 in accordance with one or more embodiments.

FIG. 8 illustrates an example embodiment of a system environment that includes the digital survey system 104 and the survey knowledge graph system 102 of FIG. 1. Specifically, the digital survey system 104 operates on computing device(s) 800. The digital survey system 104 includes the survey knowledge graph system 102. The survey knowledge graph system 102 includes a knowledge graph manager 802, a survey manager 804, a response manager 806, a topic extraction manager 808, a benchmark manager 810, and a data storage manager 812. Although the survey knowledge graph system 102 is depicted as having various components, the survey knowledge graph system 102 can have any number of additional or alternative components. Alternatively, one or more components of the survey knowledge graph system 102 can be combined into fewer components or divided into more components. Additionally, although the survey knowledge graph system 102 may be on any number of computing devices or on a single computing device.

In one or more embodiments, each of the components and subcomponents of the survey knowledge graph system 102 can be in communication with one another using any suitable communication technologies. It will be recognized that although the subcomponents of the survey knowledge graph system 102 are shown to be separate in FIG. 8, any of the subcomponents can be combined into fewer components, such as into a single component, or divided into more components as can serve a particular implementation. Furthermore, although the components of FIG. 8 are described in connection with the survey knowledge graph system 102, at least some of the components for performing operations in conjunction with the survey knowledge graph system 102 described herein can be implemented on other devices and/or with other systems.

The components of the survey knowledge graph system 102 can include software, hardware, or both. For example, the components of the survey knowledge graph system 102 can include one or more instructions stored on computer-readable storage mediums and executable by processors of one or more computing devices. When executed by the one or more processors, the computer-executable instructions of the survey knowledge graph system 102 can cause the computing device(s) 800 to perform the operations described herein. Alternatively, the components of the survey knowledge graph system 102 can comprise hardware, such as a special purpose processing device to perform a certain function or group of functions. Additionally, the components of the survey knowledge graph system 102 can comprise a combination of computer-executable instructions and hardware.

Furthermore, the components of the survey knowledge graph system 102 performing the functions described herein can, for example, be implemented as part of a stand-alone application, as a module of an application, as part of a suite of applications, as a plug-in for applications including content creation applications, as a library function or functions that can be called by other applications, and/or as a cloud-computing model. Thus, various components of the survey knowledge graph system 102 can be implemented as part of a stand-alone application on a personal computing device or a mobile device. For example, the components of the survey knowledge graph system 102 can be implemented in any application that allows the creation and administration of surveys, generation and management of a knowledge graph, and digital benchmarking, as can serve a particular embodiment.

As illustrated, the survey knowledge graph system 102 includes the knowledge graph manager 802 to generate and maintain a knowledge graph. In particular, the knowledge graph manager 802 can generate a knowledge graph based on a plurality of topics in a predefined topic ontology associated with one or more entities. For example, the knowledge graph manager 802 can determine nodes associated with data and edge weights (e.g., relationships/connections) between the nodes indicating relationships between the data. The knowledge graph manager 802 can also access and interpret data within a knowledge graph (e.g., by crawling the knowledge graph) for one or more operations on the data in the knowledge graph.

Additionally, the survey knowledge graph system 102 includes the survey manager 804 that facilitates the creation and administration of electronic surveys. For example, the survey manager 804 can administer electronic survey questions to a plurality of respondent devices associated with a plurality of respondents. The survey manager 804 can also manage the audiences of electronic surveys, such as via selection of respondents for specific electronic surveys.

In one or more embodiments, the survey knowledge graph system 102 includes the response manager 806 to manage response data for electronic surveys. To illustrate, the response manager 806 can obtain response data for an electronic survey such as by communicating with respondent devices. The response manager 806 can also manage the response data by tying respondent identities to response data for later use in generating and connecting nodes within a knowledge graph.

FIG. 8 further illustrates that the survey knowledge graph system 102 includes the topic extraction manager 808 to extract topics from response data or other survey data associated with electronic surveys. Specifically, the topic extraction manager 808 can utilize language processing, keyword searching/matching, or other text analysis to extract topics from survey data related to electronic survey questions in an electronic survey. Additionally, the topic extraction manager 808 can also use machine-learning classifiers to extract topics from survey data.

The survey knowledge graph system 102 of FIG. 8 also includes a benchmark manager 810 to generate digital benchmarks for datasets. In particular, the benchmark manager 810 utilizes a knowledge graph to compare datasets. For instance, the benchmark manager 810 accesses data nodes and edges between nodes to interpret datasets linked to a particular schema. The benchmark manager 810 can also make inferences based on data stored within a knowledge graph for comparing datasets.

The survey knowledge graph system 102 can also include the data storage manager 812 to store data associated with the operations of survey administration, knowledge graph generation and maintenance, and digital benchmarking. To illustrate, the data storage manager 812 can communicate with other components of the survey knowledge graph system 102 to store data including electronic surveys, user profiles/accounts, user transaction data, user experience data, and a knowledge graph. The data storage manager 812 can also communicate with the other components of the survey knowledge graph system 102 to provide stored data within a knowledge graph and for performing survey administration and knowledge graph generation/analysis.

Figure 9:
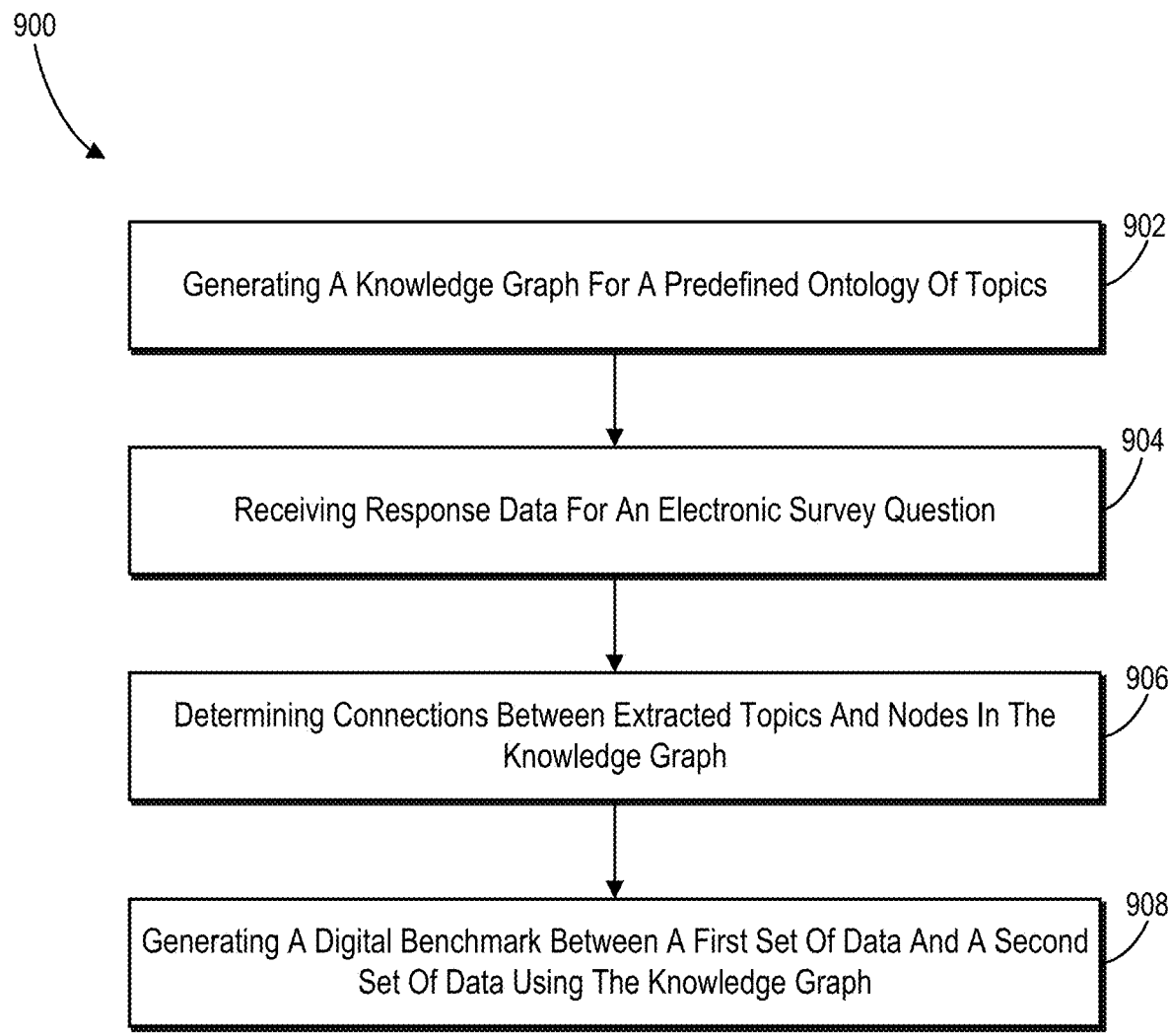
FIG. 9 illustrates a flowchart of a series of acts for utilizing a knowledge graph including response data connected to a predefined ontology of topics to generate a digital benchmark between two datasets.

Turning now to FIG. 9, this figure illustrates a flowchart of a series of acts 900 of utilizing a knowledge graph including response data connected to a predefined ontology of topics to generate a digital benchmark between two datasets in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer readable medium can comprise instructions that, when executed by one or more processors, cause a computing device to perform the acts of FIG. 9. In still further embodiments a system can perform the acts of FIG. 9.

The series of acts 900 includes an act 902 of generating a knowledge graph for a predefined ontology of topics. For example, act 902 involves generating a knowledge graph comprising a plurality of nodes corresponding to a predefined ontology of topics and a plurality of edges indicating relationships associated with the predefined ontology of topics.

As part of act 902, or as an additional act, the series of acts 900 can include determining a first entity ontology comprising a first set of topics associated with a first entity. The series of acts 900 can include determining first correspondences between the first set of topics of the first entity ontology and the predefined ontology of topics. The series of acts 900 can include determining the relationship between the extracted topic of the one or more extracted topics and the topic of the predefined ontology of topics based on the first correspondences between the first set of topics of the first entity ontology and the predefined ontology of topics.

The series of acts 900 can also include determining a second entity ontology comprising a second set of topics associated with a second entity. The series of acts 900 can then include determining the predefined ontology of topics based on the first entity ontology and the second entity ontology.

The series of acts 900 can also include determining a second entity ontology comprising a second set of topics associated with a second entity. The series of acts 900 can then include determining second correspondences between the second set of topics of the second entity ontology and the predefined ontology of topics, the first correspondences associated with the first set of topics being different than the second correspondences associated with the second set of topics based on different terminologies for the first set of topics and the second set of topics.

The series of acts 900 also includes an act 904 of receiving response data for an electronic survey question. For example, act 904 involves receiving, from one or more client devices, response data for one or more electronic survey questions of an electronic survey. Act 904 can involve determining survey data comprising the response data associated with a response of the one or more electronic survey questions and question data associated with the one or more electronic survey questions. Act 904 can also involve extracting a topic from one or more words in the response data and the question data.

Additionally, the series of acts 900 includes an act 906 of determining connections between extracted topics and nodes in the knowledge graph. For example, act 906 involves determining one or more connections between one or more extracted topics from the response data and the plurality of nodes in the knowledge graph.

As part of act 906, or as an additional act, the series of acts 900 can include determining the one or more extracted topics from the response data by determining that the response data comprises a text response to an electronic survey question of the one or more electronic survey questions. Additionally, the series of acts 900 can further include extracting a topic indicated in the text response or in connection with a question associated with the text response.

Act 906 can further involve determining that the topic indicated in the text response or in connection with the question corresponds to one or more topics in the predefined ontology of topics. Act 906 can also involve associating the topic indicated in the text response with a topic node of the plurality of nodes based on the one or more topics in the predefined ontology of topics.

Act 906 can also involve receiving the text response from a respondent client device of a respondent. Act 906 can also involve generating, in response to associating the topic indicated in the text response with the topic node, a leaf user node connected by an edge to the topic node based on respondent data associated with the respondent. Additionally, act 906 can involve generating an experience node comprising the response data from the text response and data inferred from the response data or the question associated with the text response. Act 906 can then involve associating the topic indicated in the text response with the topic node by connecting the experience node to the topic node via an edge indicating a relationship between the text response and the topic node.

For example, act 906 can involve generating an experience node comprising survey data corresponding to an electronic survey question of the one or more electronic survey questions, the survey data comprising the response data. Act 906 can then involve extracting a topic from the survey data utilizing text analysis of the electronic survey question and the response data. Additionally, act 906 can involve connecting the experience node to a topic node of the plurality of nodes within the knowledge graph based on the topic extracted from the survey data.

Act 906, or another act, can involve determining activity data associated with one or more activities performed by the respondent. Act 906 can also involve generating one or more leaf activity nodes connected by one or more edges to the leaf user node within the knowledge graph, wherein the first information is further stored in the one or more leaf activity nodes.

Act 906 can also involve determining, utilizing classifiers trained on the predefined ontology of topics and a plurality of manually labeled text responses, that the topic is indicated by one or more words in the text response corresponds to the one or more topics in the predefined ontology of topics.

Act 906 can involve inferring, utilizing a machine-learning model or keyword matching, a relationship between an extracted topic of the one or more extracted topics and a topic of the predefined ontology of topics. Act 906 can then involve associating the extracted topic with a topic node of the plurality of nodes based on the relationship.

The series of acts 900 further includes an act 908 of generating a digital benchmark between a first set of data and a second set of data using the knowledge graph. For example, act 908 involves generating a digital benchmark for a first set of data relative to a second set of data according to the one or more connections between the response data and the plurality of nodes within the knowledge graph.

Act 908 can involve determining that the first set of data corresponds to a first plurality of nodes connected to the topic node, the first plurality of nodes comprising the leaf user node and the experience node. Additionally, act 908 can involve determining that the second set of data corresponds to a second plurality of nodes connected to the topic node. Act 908 can then involve generating the digital benchmark based on a comparison of first information stored in the leaf user node and the experience node to second information stored in the second plurality of nodes. Act 908 can also involve generating the digital benchmark further based on the one or more leaf activity nodes. For example, act 908 can involve generating the digital benchmark based on a comparison of first information stored in the first plurality of nodes to second information stored in the second plurality of nodes.

Act 908 can involve determining that the first set of data corresponds to a first plurality of nodes connected to the topic node, the first plurality of nodes comprising first information related to the first entity. Act 908 can involve determining that the second set of data corresponds to a second plurality of nodes connected to the topic node, the second plurality of nodes comprising second information related to the second entity. Act 908 can further involve generating the digital benchmark based on a comparison of the first information and the second information.

Act 908 can involve determining the first set of data by accessing a first set of nodes comprising first leaf user nodes and first experience nodes connected to a topic node of the plurality of nodes within the knowledge graph. Act 908 can also involve determining the second set of data by accessing a second set of nodes comprising second leaf user nodes and second experience nodes connected to the topic node of the plurality of nodes within the knowledge graph.

The series of acts 900 can also include receiving, via an agent client device, a request for user information associated with the respondent during a live communication between the respondent and an agent associated with the agent client device. The series of acts 900 can also include accessing, based on a user identifier associated with the respondent, data from the leaf user node and one or more additional leaf nodes connected to the leaf user node via one or more edges. Additionally, the series of acts 900 can include providing the data from the leaf user node and the one or more additional leaf nodes to the agent client device during the live communication.

Embodiments of the present disclosure may comprise or utilize a special-purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAS, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 10:
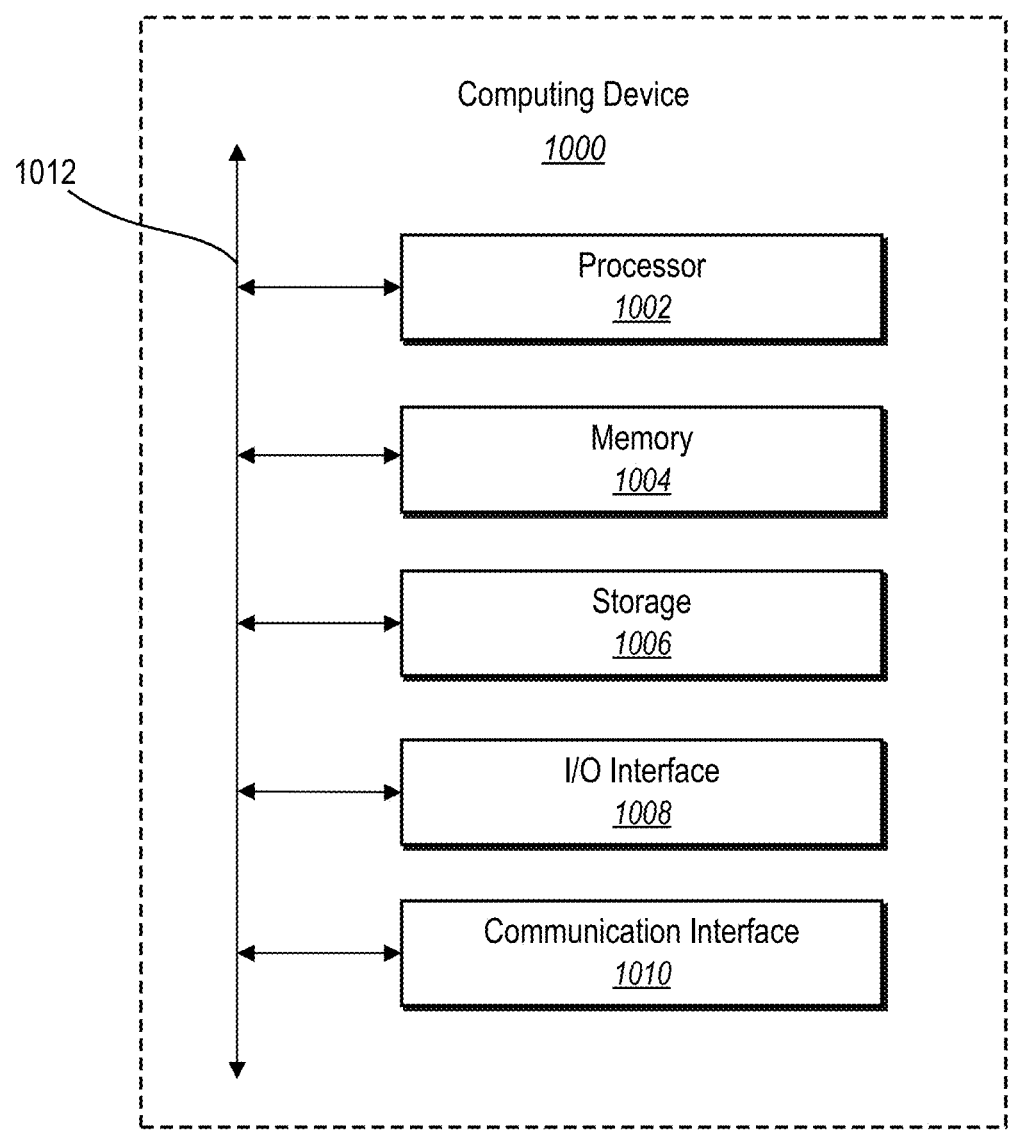
FIG. 10 illustrates a block diagram of a computing device in accordance with one or more embodiments.

FIG. 10 illustrates a block diagram of an exemplary computing device 1000 that may be configured to perform one or more of the processes described above. One will appreciate that one or more computing devices such as the computing device 1000 may implement the devices described above in connection with FIG. 1. As shown by FIG. 10, the computing device 1000 can comprise a processor 1002, a memory 1004, a storage device 1006, an I/O interface 1008, and a communication interface 1010, which may be communicatively coupled by way of a communication infrastructure 1012. While the exemplary computing device 1000 is shown in FIG. 10, the components illustrated in FIG. 10 are not intended to be limiting. Additional or alternative components may be used in other embodiments. Furthermore, in certain embodiments, the computing device 1000 can include fewer components than those shown in FIG. 10. Components of the computing device 1000 shown in FIG. 10 will now be described in additional detail.

In one or more embodiments, the processor 1002 includes hardware for executing instructions, such as those making up a computer program. As an example, and not by way of limitation, to execute instructions, the processor 1002 may retrieve (or fetch) the instructions from an internal register, an internal cache, the memory 1004, or the storage device 1006 and decode and execute them. In one or more embodiments, the processor 1002 may include one or more internal caches for data, instructions, or addresses. As an example, and not by way of limitation, the processor 1002 may include one or more instruction caches, one or more data caches, and one or more translation lookaside buffers ("TLBs"). Instructions in the instruction caches may be copies of instructions in the memory 1004 or the storage device 1006.

The memory 1004 may be used for storing data, metadata, and programs for execution by the processor(s). The memory 1004 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1004 may be internal or distributed memory.

The storage device 1006 includes storage for storing data or instructions. As an example, and not by way of limitation, storage device 1006 can comprise a non-transitory storage medium described above. The storage device 1006 may include a hard disk drive ("HDD"), a floppy disk drive, flash memory, an optical disc, a magneto-optical disc, magnetic tape, or a Universal Serial Bus ("USB") drive or a combination of two or more of these. The storage device 1006 may include removable or non-removable (or fixed) media, where appropriate. The storage device 1006 may be internal or external to the computing device 1000. In one or more embodiments, the storage device 1006 is non-volatile, solid-state memory. In other embodiments, the storage device 1006 includes read-only memory ("ROM"). Where appropriate, this ROM may be mask programmed ROM, programmable ROM ("PROM"), erasable PROM ("EPROM"), electrically erasable PROM ("EEPROM"), electrically alterable ROM ("EAROM"), or flash memory or a combination of two or more of these.

The I/O interface 1008 allows a user to provide input to, receive output from, and otherwise transfer data to and receive data from the computing device 1000. The I/O interface 1008 may include a mouse, a keypad or a keyboard, a touch screen, a camera, an optical scanner, network interface, modem, other known I/O devices or a combination of such I/O interfaces. The I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example and not by way of limitation, the communication interface 1010 may include a network interface controller ("NIC") or network adapter for communicating with an Ethernet or other wire-based network or a wireless NIC ("WNIC") or wireless adapter for communicating with a wireless network, such as a WI-FI.

Additionally, or alternatively, the communication interface 1010 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, the communication interface 1010 may facilitate communications with a wireless PAN ("WPAN") (such as, for example, a BLUETOOTH WPAN), a WI-FI network, a WI-MAX network, a cellular telephone network (such as, for example, a Global System for Mobile Communications ("GSM") network), or other suitable wireless network or a combination thereof.

Additionally, the communication interface 1010 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1012 may include hardware, software, or both that couples components of the computing device 1000 to each other. As an example and not by way of limitation, the communication infrastructure 1012 may include an Accelerated Graphics Port ("AGP") or other graphics bus, an Enhanced Industry Standard Architecture ("EISA") bus, a front-side bus ("FSB"), a HYPERTRANSPORT ("HT") interconnect, an Industry Standard Architecture ("ISA") bus, an INFINIBAND interconnect, a low-pin-count ("LPC") bus, a memory bus, a Micro Channel Architecture ("MCA") bus, a Peripheral Component Interconnect ("PCI") bus, a PCI-Express ("PCIe") bus, a serial advanced technology attachment ("SATA") bus, a Video Electronics Standards Association local ("VLB") bus, or another suitable bus or a combination thereof.

Figure 11:
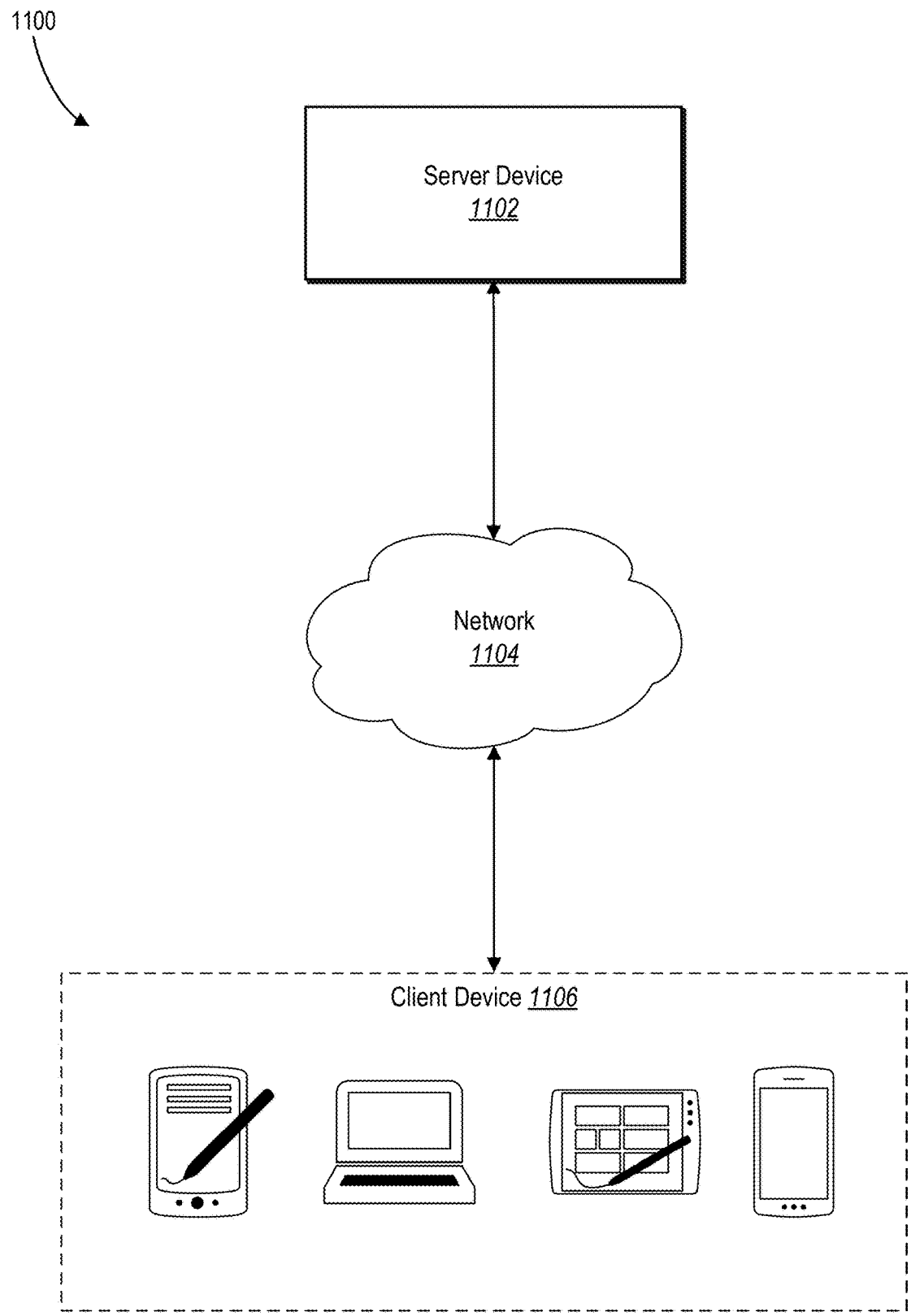
FIG. 11 illustrates a network environment of a digital survey system in accordance with one or more embodiments.

FIG. 11 illustrates an example network environment 1100 of the digital survey system 104. Network environment 1100 includes a client device 1106, and a server device 1102 connected to each other by a network 1104. Although FIG. 11 illustrates a particular arrangement of client device 1106, server device 1102, and network 1104, this disclosure contemplates any suitable arrangement of client device 1106, server device 1102, and network 1104. As an example, and not by way of limitation, two or more of the client devices 1106, and server devices 1102 may be connected to each other directly, bypassing network 1104. As another example, two or more of client devices 1106 and server devices 1102 may be physically or logically co-located with each other in whole, or in part. Moreover, although FIG. 11 illustrates a particular number of client devices 1106, server devices 1102, and networks 1104, this disclosure contemplates any suitable number of client devices 1106, server devices 1102, and networks 1104. As an example, and not by way of limitation, network environment 1100 may include multiple client devices 1106, server devices 1102, and networks 1104.

This disclosure contemplates any suitable network 1104. As an example and not by way of limitation, one or more portions of network 1104 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1104 may include one or more networks 1104.

Links may connect client device 1106, and server device 1102 to network 1104 or to each other. This disclosure contemplates any suitable links. In particular embodiments, one or more links include one or more wireline (such as for example Digital Subscriber Line ("DSL") or Data Over Cable Service Interface Specification ("DOCSIS")), wireless (such as for example Wi-Fi or Worldwide Interoperability for Microwave Access ("WiMAX")), or optical (such as for example Synchronous Optical Network (SONET) or Synchronous Digital Hierarchy ("SDH")) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1100. One or more first links may differ in one or more respects from one or more second links.

In particular embodiments, client device 1106 may be an electronic device including hardware, software, or embedded logic components or a combination of two or more such components and capable of carrying out the appropriate functionalities implemented or supported by client device 1106. As an example, and not by way of limitation, a client device 1106 may include any of the computing devices discussed above in relation to FIG. 10. A client device 1106 may enable a network user at client device 1106 to access network 1104.

In particular embodiments, client device 1106 may include a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client device 1106 may enter a Uniform Resource Locator ("URL") or other address directing the web browser to a particular server (such as server, or a server associated with a third-party system), and the web browser may generate a Hyper Text Transfer Protocol ("HTTP") request and communicate the HTTP request to server. The server may accept the HTTP request and communicate to client device 1106 one or more Hyper Text Markup Language ("HTML") files responsive to the HTTP request. Client device 1106 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, server device 1102 may include a variety of servers, sub-systems, programs, modules, logs, and data stores. In particular embodiments, server device 1102 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Server device 1102 may also include suitable components such as network interfaces, security mechanisms, load balancers, failover servers, management-and-network-operations consoles, other suitable components, or any suitable combination thereof.

In particular embodiments, server device 1102 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. Additionally, a user profile may include financial and billing information of users.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause a computing device to:
    generate a knowledge graph comprising a plurality of nodes corresponding to a predefined ontology of topics and a plurality of edges indicating relationships associated with the predefined ontology of topics;
    receive, from one or more client devices, survey data comprising question data and response data for one or more electronic survey questions of an electronic survey;
    determine one or more connections between one or more extracted topics from the survey data and the plurality of nodes in the knowledge graph;
    incorporate the survey data from the one or more client devices into the knowledge graph by:
        generating additional nodes comprising the survey data with node types including person nodes representing respondents of the electronic survey and one or more transaction nodes, operational nodes, or experience nodes representing data types extracted from the survey data; and
        generating additional edges in the knowledge graph linking the additional nodes comprising the survey data to the plurality of nodes within the knowledge graph according to the one or more connections between the one or more extracted topics of the survey data and the plurality of nodes within the knowledge graph and relationships corresponding to the node types;
receive, from an agent client device, a request for user information associated with a user during a live chat session involving a user client device of the user and the agent client device of an agent user occurring after receiving the survey data from the one or more client devices, wherein the live chat session comprises one or more messages between the user and the agent user displayed in a first portion of a graphical user interface of the agent client device;
determine an identity of the user involved in the live chat session and a topic of the live chat session;
access, during the live chat session, a person node of the user from the knowledge graph in response to determining the identity of the user involved in the live chat session;
access, during the live chat session in response to accessing the person node of the user utilizing the identity of the user and based on the topic of the live chat session, one or more additional nodes comprising one or more transaction nodes, one or more operational nodes, or one or more experience nodes connected to the person node of the user, the one or more additional nodes comprising a subset of survey data corresponding to one or more electronic surveys administered to the user and incorporated into the knowledge graph prior to the live chat session;
generate, during the live chat session, a digital benchmark comparing the subset of survey data corresponding to the one or more electronic surveys administered to the user to an additional subset of survey data of a plurality of additional users according to the one or more connections between the additional nodes comprising the survey data and the plurality of nodes corresponding to the predefined ontology of topics within the knowledge graph; and
provide, to the agent client device during the live chat session involving the user client device of the user and the agent client device of the agent user and within a second portion of the graphical user interface of the agent client device, the subset of survey data corresponding to the one or more electronic surveys from the one or more transaction nodes, the one or more operational nodes, or the one or more experience nodes and the digital benchmark comparing the subset of survey data relative to the additional subset of survey data of the plurality of additional users, the second portion of the graphical user interface of the agent client device being different than the first portion of the graphical user interface displaying the one or more messages between the user and the agent user.

2. The non-transitory computer readable storage medium as recited in claim 1, further comprising instructions that, when executed by the at least one processor, cause the computing device to determine the one or more extracted topics from the survey data by:
determining that the response data comprises a text response to an electronic survey question of the one or more electronic survey questions; and
extracting a topic indicated in the text response or in connection with a question associated with the text response.

3. The non-transitory computer readable storage medium as recited in claim 2, further comprising instructions that, when executed by the at least one processor, cause the computing device to determine the one or more connections between the one or more extracted topics from the survey data and the plurality of nodes in the knowledge graph by:
determining that the topic indicated in the text response or in connection with the question corresponds to one or more topics in the predefined ontology of topics; and
associating the topic indicated in the text response with a topic node of the plurality of nodes based on the one or more topics in the predefined ontology of topics.

4. The non-transitory computer readable storage medium as recited in claim 3, further comprising instructions that, when executed by the at least one processor, cause the computing device to:
receive the text response from a respondent client device of the user; and
generate, in response to associating the topic indicated in the text response with the topic node, a leaf user node connected by an edge to the topic node based on respondent data associated with the user, the leaf user node comprising a person node type.

5. The non-transitory computer readable storage medium as recited in claim 3, further comprising instructions that, when executed by the at least one processor, cause the computing device to determine the one or more connections between the one or more extracted topics from the survey data and the plurality of nodes in the knowledge graph by determining, utilizing classifiers trained on the predefined ontology of topics and a plurality of manually labeled text responses, that the topic is indicated by one or more words in the text response corresponds to the one or more topics in the predefined ontology of topics.

6. The non-transitory computer readable storage medium as recited in claim 4, further comprising instructions that, when executed by the at least one processor, cause the computing device to:
generate an experience node comprising experience data of the response data from the text response and data inferred from the response data or the question associated with the text response; and
associate the topic indicated in the text response with the topic node by connecting the experience node to the topic node via one or more edges indicating a relationship between the text response and the topic node.

7. The non-transitory computer readable storage medium as recited in claim 6, further comprising instructions that, when executed by the at least one processor, cause the computing device to generate the digital benchmark by:
determining that the subset of survey data corresponds to a first plurality of nodes connected to the topic node, the first plurality of nodes comprising the leaf user node and the experience node;
determining that the additional subset of survey data of the plurality of additional users corresponds to a second plurality of nodes connected to the topic node; and
generating the digital benchmark based on a comparison of first information stored in the leaf user node and the experience node to second information stored in the second plurality of nodes.

8. The non-transitory computer readable storage medium as recited in claim 6, further comprising instructions that, when executed by the at least one processor, cause the computing device to:
access, based on the topic of the live chat session, a transaction history associated with the user for the topic from the one or more additional nodes connected to the person node via one or more edges; and provide, within the second portion of the graphical user interface of the agent client device, the transaction history associated with the user for the topic during the live chat session.

9. The non-transitory computer readable storage medium as recited in claim 7, further comprising instructions that, when executed by the at least one processor, cause the computing device to:

determine, based on the survey data, activity data associated with one or more activities performed by the user;

generate one or more leaf activity nodes connected by one or more edges to the leaf user node within the knowledge graph, wherein the first information is further stored in the one or more leaf activity nodes; and generate the digital benchmark further based on the one or more leaf activity nodes.

10. A system comprising:

at least one processor; and at least one non-transitory computer readable storage medium comprising instructions that, when executed by at least one processor, cause the system to:

generate a knowledge graph comprising a plurality of nodes corresponding to a predefined ontology of topics and a plurality of edges indicating relationships associated with the predefined ontology of topics;

receive, from one or more client devices, survey data comprising question data and response data for one or more electronic survey questions of an electronic survey;

determine one or more connections between one or more extracted topics from the survey data and the plurality of nodes in the knowledge graph;

incorporate the survey data from the one or more client devices into the knowledge graph by:

generating additional nodes comprising the survey data with node types including person nodes representing respondents of the electronic survey and one or more transaction nodes, operational nodes, or experience nodes representing data types extracted from the survey data; and generating additional edges in the knowledge graph linking the additional nodes comprising the survey data to the plurality of nodes within the knowledge graph according to the one or more connections between the one or more extracted topics of the survey data and the plurality of nodes within the knowledge graph and relationships corresponding to the node types;

receive, from an agent client device, a request for user information associated with a user during a live chat session involving a user client device of the user and the agent client device of an agent user occurring after receiving the survey data from the one or more client devices, wherein the live chat session comprises one or more messages between the user and the agent user displayed in a first portion of a graphical user interface of the agent client device;

determine an identity of the user involved in the live chat session and a topic of the live chat session;

access, during the live chat session, a person node of the user from the knowledge graph in response to determining the identity of the user involved in the live chat session;

access, during the live chat session in response to accessing the person node of the user utilizing the identity of the user and based on the topic of the live chat session, one or more additional nodes comprising one or more transaction nodes, one or more operational nodes, or one or more experience nodes connected to the person node of the user, the one or more additional nodes comprising a subset of survey data corresponding to one or more electronic surveys administered to the user and incorporated into the knowledge graph prior to the live chat session;

generate, during the live chat session, a digital benchmark comparing the subset of survey data corresponding to the one or more electronic surveys administered to the user to an additional subset of survey data of a plurality of additional users according to the one or more connections between the additional nodes comprising the survey data and the plurality of nodes corresponding to the predefined ontology of topics within the knowledge graph; and provide, to the agent client device during the live chat session involving the user client device of the user and the agent client device of the agent user and within a second portion of the graphical user interface of the agent client device, the subset of survey data corresponding to one or more electronic surveys from the one or more transaction nodes, the one or more operational nodes, or the one or more experience nodes and the digital benchmark comparing the subset of survey data relative to the additional subset of survey data of the plurality of additional users, the second portion of the graphical user interface of the agent client device being different than the first portion of the graphical user interface displaying the one or more messages between the user and the agent user.

11. The system as recited in claim 10, further comprising instructions that, when executed by the at least one processor, cause the system to determine the one or more extracted topics by:

extracting a topic from one or more words in the response data and the question data of the survey data.

12. The system as recited in claim 10, further comprising instructions that, when executed by the at least one processor, cause the system to determine the one or more connections between the one or more extracted topics from the response data and the plurality of nodes in the knowledge graph by:

inferring, utilizing a machine-learning model or keyword matching, a relationship between an extracted topic of the one or more extracted topics and a topic of the predefined ontology of topics; and associating the extracted topic with a topic node of the plurality of nodes based on the relationship.

13. The system as recited in claim 12, further comprising instructions that, when executed by the at least one processor, cause the system to:

determine a first entity ontology comprising a first set of topics associated with a first entity;

determine first correspondences between the first set of topics of the first entity ontology and the predefined ontology of topics; and determine the relationship between the extracted topic of the one or more extracted topics and the topic of the predefined ontology of topics based on the first correspondences between the first set of topics of the first entity ontology and the predefined ontology of topics.

14. The system as recited in claim 13, further comprising instructions that, when executed by the at least one processor, cause the system to:
  determine a second entity ontology comprising a second set of topics associated with a second entity; and
  determine second correspondences between the second set of topics of the second entity ontology and the predefined ontology of topics, the first correspondences associated with the first set of topics being different than the second correspondences associated with the second set of topics based on different terminologies for the first set of topics and the second set of topics.

15. The system as recited in claim 14, further comprising instructions that, when executed by the at least one processor, cause the system to generate the digital benchmark by:
  determining that the subset of survey data corresponds to a first plurality of nodes connected to the topic node, the first plurality of nodes comprising first information related to the first entity;
  determining that the additional subset of survey data of the plurality of additional users corresponds to a second plurality of nodes connected to the topic node, the second plurality of nodes comprising second information related to the second entity; and
  generating the digital benchmark based on a comparison of the first information and the second information.

16. The system as recited in claim 10, further comprising instructions that, when executed by the at least one processor, cause the system to generate the digital benchmark by:
  determining the subset of survey data by accessing a first set of nodes comprising the person node and first experience nodes connected to a topic node of the plurality of nodes within the knowledge graph; and
  determining the additional subset of survey data by accessing a second set of nodes comprising additional person nodes and second experience nodes connected to the topic node of the plurality of nodes within the knowledge graph.

17. A computer-implemented method comprising:
  generating, by at least one processor, a knowledge graph comprising a plurality of nodes corresponding to a predefined ontology of topics and a plurality of edges indicating relationships associated with the predefined ontology of topics;
  receiving, by the at least one processor and from one or more client devices, survey data comprising question data and response data for one or more electronic survey questions of an electronic survey;
  determining, by the at least one processor, one or more connections between one or more extracted topics from the survey data and the plurality of nodes in the knowledge graph;
  incorporating the survey data from the one or more client devices into the knowledge graph by:
    generating additional nodes comprising the survey data with node types including person nodes representing respondents of the electronic survey and one or more transaction nodes, operational nodes, or experience nodes representing data types extracted from the survey data; and
    generating additional edges in the knowledge graph linking the additional nodes comprising the survey data to the plurality of nodes within the knowledge graph according to the one or more connections between the one or more extracted topics of the survey data and the plurality of nodes with the knowledge graph and relationships corresponding to the node types;
  receiving, from an agent client device, a request for user information associated with a user during a live chat session involving a user client device of the user and the agent client device of an agent user occurring after receiving the survey data from the one or more client devices, wherein the live chat session comprises one or more messages between the user and the agent user displayed in a first portion of a graphical user interface of the agent client device;
  determining an identity of the user involved in the live chat session and a topic of the live chat session;
  accessing, during the live chat session, a person node of the user from the knowledge graph in response to determining the identity of the user involved in the live chat session;
  accessing, during the live chat session and based on the topic of the live chat session, one or more additional nodes comprising one or more transaction nodes, one or more operational nodes, or one or more experience nodes connected to the person node of the user, the one or more additional nodes comprising a subset of survey data corresponding to one or more electronic surveys administered to the user;
  generating, by the at least one processor during the live chat session in response to accessing the person node of the user utilizing the identity of the user, a digital benchmark comparing the subset of survey data corresponding to the one or more electronic surveys administered to the user to an additional subset of survey data of a plurality of additional users according to the one or more connections between the additional nodes comprising the survey data and the plurality of nodes corresponding to the predefined ontology of topics within the knowledge graph and incorporated into the knowledge graph prior to the live chat session; and
  providing, to the agent client device during the live chat session involving the user client device of the user and the agent client device of the agent user and within a second portion of the graphical user interface of the agent client device, the subset of survey data corresponding to the one or more electronic surveys from the one or more transaction nodes, the one or more operational nodes, or the one or more experience nodes and the digital benchmark comparing the subset of survey data relative to the additional subset of survey data of the plurality of additional users, the second portion of the graphical user interface of the agent client device being different than the first portion of the graphical user interface displaying the one or more messages between the user and the agent user.

18. The computer-implemented method as recited in claim 17, wherein generating the knowledge graph comprises:
  determining a first entity ontology comprising a first set of topics associated with a first entity;
  determining a second entity ontology comprising a second set of topics associated with a second entity; and
  determining the predefined ontology of topics based on the first entity ontology and the second entity ontology.

19. The computer-implemented method as recited in claim 17, wherein determining the one or more connections comprises:

generating an experience node comprising experience data of the survey data corresponding to an electronic survey question of the one or more electronic survey questions;

extracting a topic from the survey data utilizing text analysis of the electronic survey question and the response data; and connecting, via one or more edges, the experience node comprising the experience data of the survey data to a topic node of the plurality of nodes within the knowledge graph based on the topic extracted from the survey data.

20. The computer-implemented method as recited in claim 17, wherein generating the digital benchmark comprises:

determining that the subset of survey data corresponds to a first plurality of nodes connected to a topic node of the plurality of nodes, the first plurality of nodes comprising first person nodes including the person node of the user, first experience nodes, first transaction nodes, or first operational nodes corresponding to a first plurality of responses for the one or more electronic survey questions;

determining that the additional subset of survey data corresponds to a second plurality of nodes connected to the topic node, the second plurality of nodes comprising second person nodes, second experience nodes, second activity nodes, or first operational nodes corresponding to a second plurality of responses for the one or more electronic survey questions; and generating the digital benchmark based on a comparison of first information stored in the first plurality of nodes to second information stored in the second plurality of nodes.

* * * * *